(12) United States Patent
McCurdy et al.

(10) Patent No.: US 12,157,822 B2
(45) Date of Patent: Dec. 3, 2024

(54) METHODS OF PRODUCING VEGETABLE OILS WITH LOW MINERALS, METALS, OR OTHER CONTAMINANTS

(71) Applicant: Poet Research, Inc., Sioux Falls, SD (US)

(72) Inventors: Alexander T. McCurdy, Sioux Falls, SD (US); Tapaswy Muppaneni, Sioux Falls, SD (US); Brett A. Flittie, Harrisburg, SD (US); Shannon S. Urban, Valley Springs, SD (US); Jacob A. Milbrandt, Tyndall, SD (US); Steven T. Bly, Sioux Falls, SD (US)

(73) Assignee: POET RESEARCH, INC., Sioux Falls, SD (US)

( * ) Notice: Subject to any disclaimer, the term of this patent is extended or adjusted under 35 U.S.C. 154(b) by 819 days.

(21) Appl. No.: 17/369,394

(22) Filed: Jul. 7, 2021

(65) Prior Publication Data

US 2021/0332244 A1  Oct. 28, 2021

Related U.S. Application Data

(63) Continuation-in-part of application No. 17/124,863, filed on Dec. 17, 2020, now Pat. No. 11,421,109, and
(Continued)

(51) Int. Cl.
*C08L 91/00* (2006.01)
*A23D 9/007* (2006.01)
(Continued)

(52) U.S. Cl.
CPC .............. *C08L 91/00* (2013.01); *A23D 9/007* (2013.01); *C08K 5/101* (2013.01); *C08L 95/00* (2013.01);
(Continued)

(58) Field of Classification Search
None
See application file for complete search history.

(56) References Cited

U.S. PATENT DOCUMENTS

| 1,247,782 A | 11/1917 | Ayres |
| 1,737,402 A | 11/1929 | Ayres |

(Continued)

FOREIGN PATENT DOCUMENTS

| BR | PI0704791 A2 | 7/2009 |
| EP | 2656834 A1 | 10/2013 |

(Continued)

OTHER PUBLICATIONS

"U.S. Appl. No. 15/988,764, Corrected Notice of Allowability mailed Jan. 27, 2020", 3 pgs.
(Continued)

*Primary Examiner* — Stefanie J Cohen
(74) *Attorney, Agent, or Firm* — Honigman LLP

(57) ABSTRACT

The present disclosure describes methods for reducing the content of minerals, metals, ions, and/or other undesirable contaminants in vegetable oil, such as corn oil, obtained from fermentation of ground vegetable material. In one aspect, the methods herein produce distiller's corn oil having low amounts of minerals, metals, ions, and/or other contaminants rendering the corn oil more suitable for various further uses, such as biofuel production, with little to no additional refining.

24 Claims, 5 Drawing Sheets

Related U.S. Application Data a continuation-in-part of application No. 17/026,771, filed on Sep. 21, 2020, now Pat. No. 11,530,369, and a continuation-in-part of application No. 16/775,822, filed on Jan. 29, 2020, now Pat. No. 11,104,922, said application No. 17/026,771 is a continuation of application No. 16/437,960, filed on Jun. 11, 2019, now Pat. No. 10,851,327, said application No. 16/775,822 is a continuation of application No. 15/988,794, filed on May 24, 2018, now Pat. No. 10,604,776, said application No. 17/124,863 is a continuation of application No. 15/988,836, filed on May 24, 2018, now Pat. No. 10,899,928, which is a continuation of application No. PCT/US2017/034262, filed on May 24, 2017.

(60) Provisional application No. 63/082,712, filed on Sep. 24, 2020, provisional application No. 62/817,789, filed on Mar. 13, 2019, provisional application No. 62/814,006, filed on Mar. 5, 2019, provisional application No. 62/683,347, filed on Jun. 11, 2018, provisional application No. 62/510,551, filed on May 24, 2017.

(51) Int. Cl.
  C08K 5/101 (2006.01)
  C08L 95/00 (2006.01)
  C11B 3/00 (2006.01)
  *A23D 9/013* (2006.01)
  *C12C 11/00* (2006.01)

(52) U.S. Cl.
  CPC .............. *C11B 3/008* (2013.01); *A23D 9/013* (2013.01); *C08L 2555/34* (2013.01); *C08L 2555/64* (2013.01); *C12C 11/006* (2013.01); *C12Y 302/01003* (2013.01)

(56) References Cited

U.S. PATENT DOCUMENTS

| | | | |
|---|---|---|---|
| 2,510,379 A | 6/1950 | Christenson | |
| 2,510,402 A | 6/1950 | Johnston | |
| 2,762,780 A | 9/1956 | Kulakow | |
| 2,881,195 A | 4/1959 | Hayes | |
| 3,354,188 A | 11/1967 | Bock | |
| 4,049,686 A | 9/1977 | Ringers et al. | |
| 4,609,500 A | 9/1986 | Strecker | |
| 4,698,185 A | 10/1987 | Dijkstra et al. | |
| 4,713,155 A | 12/1987 | Arutjunian et al. | |
| 5,208,054 A | 5/1993 | Torii et al. | |
| 5,239,096 A | 8/1993 | Rohdenburg et al. | |
| 5,512,691 A | 4/1996 | Barnicki et al. | |
| 5,516,924 A | 5/1996 | van de Sande et al. | |
| 6,015,915 A | 1/2000 | Jamil et al. | |
| 6,033,706 A | 3/2000 | Silkeberg et al. | |
| 6,074,863 A | 6/2000 | Svendsen et al. | |
| 6,103,918 A | 8/2000 | Dahlen | |
| 6,407,271 B1 | 6/2002 | Deffense | |
| 6,426,423 B1 | 7/2002 | Copeland et al. | |
| 6,514,332 B2 | 2/2003 | Varnadoe et al. | |
| 6,743,930 B2 | 6/2004 | Li | |
| 6,764,542 B1 | 7/2004 | Lackey et al. | |
| 6,776,832 B2 | 8/2004 | Spence et al. | |
| 6,844,458 B2 | 1/2005 | Copeland et al. | |
| 6,924,381 B2 | 8/2005 | Dawson | |
| 7,122,216 B2 | 10/2006 | Copeland et al. | |
| 7,582,458 B2 | 9/2009 | Grichko | |
| 7,601,858 B2 | 10/2009 | Cantrell et al. | |
| 7,696,369 B2 | 4/2010 | Kellens et al. | |
| 7,713,727 B2 | 5/2010 | Dayton et al. | |
| 7,842,484 B2 | 11/2010 | Lewis | |
| 7,879,917 B2 | 2/2011 | Cheng et al. | |
| 7,893,115 B2 | 2/2011 | Cheng et al. | |
| 7,919,291 B2 | 4/2011 | Lewis et al. | |
| 8,008,516 B2 | 8/2011 | Cantrell et al. | |
| 8,076,123 B2 | 12/2011 | Chou | |
| 8,114,926 B2 | 2/2012 | Dupuis et al. | |
| 8,163,059 B2 | 4/2012 | Tran et al. | |
| 8,232,418 B1 | 7/2012 | Bilbie et al. | |
| 8,435,766 B2 | 5/2013 | Kellens et al. | |
| 8,476,047 B2 | 7/2013 | Burlew et al. | |
| 8,608,845 B2 | 12/2013 | Naidoo et al. | |
| 8,702,819 B2 | 4/2014 | Bootsma | |
| 8,759,044 B2 | 6/2014 | DiCosimo et al. | |
| 8,765,425 B2 | 7/2014 | Dicosimo et al. | |
| 8,765,985 B2 | 7/2014 | Hora et al. | |
| 8,808,445 B2 | 8/2014 | Coe | |
| 8,901,330 B2 | 12/2014 | Doyle et al. | |
| 8,962,059 B1 | 2/2015 | Froderman et al. | |
| 9,045,712 B2 | 6/2015 | Dayton et al. | |
| 9,061,987 B2 | 6/2015 | Bootsma | |
| 9,109,179 B2 | 8/2015 | Cowin et al. | |
| 9,139,803 B2 | 9/2015 | Redford | |
| 9,144,758 B2 | 9/2015 | Wang et al. | |
| 9,228,211 B2 | 1/2016 | Soe et al. | |
| 9,255,239 B2 | 2/2016 | Wiese | |
| 9,290,728 B2 | 3/2016 | Bootsma | |
| 9,340,749 B1 | 5/2016 | Kozyuk et al. | |
| 9,388,100 B2 | 7/2016 | Redford | |
| 9,416,274 B2 | 8/2016 | Frank | |
| 9,453,180 B2 | 9/2016 | Kozyuk et al. | |
| 9,481,794 B2 | 11/2016 | Cox | |
| 9,481,853 B2 | 11/2016 | Gordon et al. | |
| 9,534,182 B1 | 1/2017 | Ballard | |
| 9,534,184 B2 | 1/2017 | Thompson et al. | |
| 9,556,399 B2 | 1/2017 | Kozyuk et al. | |
| 9,617,425 B1 | 4/2017 | Moriyasu et al. | |
| 9,695,449 B2 | 7/2017 | Bootsma | |
| 9,765,280 B2 | 9/2017 | Kurth et al. | |
| 9,783,458 B2 | 10/2017 | Martin | |
| 9,896,643 B2 | 2/2018 | Redford | |
| 9,961,916 B2 | 5/2018 | Arhancet et al. | |
| 10,087,397 B2 | 10/2018 | Phillips et al. | |
| 10,113,187 B2 | 10/2018 | Bushong et al. | |
| 10,167,390 B2 | 1/2019 | Cox | |
| 10,323,148 B1 | 6/2019 | Brewster et al. | |
| 10,526,564 B2 | 1/2020 | Phillips et al. | |
| 10,526,623 B2 | 1/2020 | Bootsma | |
| 10,584,304 B2 | 3/2020 | Schnell et al. | |
| 10,604,776 B2 | 3/2020 | McCurdy et al. | |
| 10,683,479 B2 | 6/2020 | Lucas | |
| 10,711,221 B2 | 7/2020 | Lamprecht et al. | |
| 10,781,464 B2 | 9/2020 | Yoshida et al. | |
| 10,815,430 B2 | 10/2020 | Gutierrez et al. | |
| 10,815,506 B2 | 10/2020 | Rancke-Madsen et al. | |
| 11,008,531 B2 | 5/2021 | Lamprecht et al. | |
| 11,268,062 B2 | 3/2022 | Lucas | |
| 2004/0063184 A1 | 4/2004 | Grichko | |
| 2006/0041152 A1 | 2/2006 | Cantrell et al. | |
| 2006/0089429 A1 | 4/2006 | Buras et al. | |
| 2006/0215483 A1 | 9/2006 | Helf | |
| 2008/0064889 A1 | 3/2008 | Palacios | |
| 2008/0146851 A1 | 6/2008 | Schonemann et al. | |
| 2008/0176298 A1 | 7/2008 | Randhava et al. | |
| 2008/0314294 A1 | 12/2008 | White et al. | |
| 2009/0137705 A1 | 5/2009 | Faucon Dumont et al. | |
| 2009/0306419 A1 | 12/2009 | Myong et al. | |
| 2010/0034586 A1 | 2/2010 | Bailey et al. | |
| 2010/0058649 A1 | 3/2010 | Bootsma | |
| 2011/0086149 A1 | 4/2011 | Bootsma | |
| 2012/0060722 A1 | 3/2012 | Montpeyroux et al. | |
| 2012/0245370 A1 | 9/2012 | Sheppard et al. | |
| 2013/0011887 A1* | 1/2013 | Dayton | C11B 3/003 435/271 |
| 2013/0109873 A1 | 5/2013 | Bootsma | |
| 2013/0157324 A1 | 6/2013 | Dicosimo et al. | |
| 2014/0106418 A1* | 4/2014 | Parekh | C12N 1/20 435/159 |
| 2014/0230693 A1 | 8/2014 | Gonzalez Leon et al. | |
| 2015/0230488 A1 | 8/2015 | de Man et al. | |

(56) References Cited

U.S. PATENT DOCUMENTS

| | | |
|---|---|---|
| 2015/0291923 A1 | 10/2015 | Bootsma |
| 2016/0145650 A1 | 5/2016 | Lewis et al. |
| 2017/0022364 A1 | 1/2017 | Cox |
| 2017/0066995 A1 | 3/2017 | Borst et al. |
| 2017/0107449 A1 | 4/2017 | Hruschka et al. |
| 2017/0107452 A1 | 4/2017 | Dasari et al. |
| 2017/0145642 A1 | 5/2017 | Swanson |
| 2017/0283838 A1 | 10/2017 | Bootsma |
| 2018/0273988 A1 | 9/2018 | Lewis et al. |
| 2018/0340067 A1 | 11/2018 | McCurdy et al. |
| 2018/0340068 A1 | 11/2018 | McCurdy et al. |
| 2018/0340197 A1 | 11/2018 | McCurdy et al. |
| 2019/0249109 A1 | 8/2019 | Lamprecht et al. |
| 2019/0376002 A1 | 12/2019 | Urban et al. |
| 2020/0063168 A1 | 2/2020 | Bootsma |
| 2020/0131403 A1 | 4/2020 | McCurdy |
| 2020/0165642 A1 | 5/2020 | McCurdy et al. |
| 2020/0299610 A1 | 9/2020 | Marques De Lima |
| 2021/0032564 A1 | 2/2021 | Urban et al. |
| 2022/0186171 A1 | 6/2022 | Lucas |

FOREIGN PATENT DOCUMENTS

| | | |
|---|---|---|
| EP | 2689006 A2 | 1/2014 |
| EP | 2264157 B1 | 5/2014 |
| GB | 481580 A | 3/1938 |
| GB | 766394 A | 1/1957 |
| GB | 1065720 A | 4/1967 |
| GB | 1562380 A | 3/1980 |
| JP | 005154467 | 6/2005 |
| JP | 4257188 B2 | 4/2009 |
| WO | WO-8802775 A1 | 4/1988 |
| WO | WO-9323508 A1 | 11/1993 |
| WO | WO-9421762 A1 | 9/1994 |
| WO | WO-9801518 A1 | 1/1998 |
| WO | WO-2004007654 A1 | 1/2004 |
| WO | WO-2004081193 A2 | 9/2004 |
| WO | WO-2008061120 A2 | 5/2008 |
| WO | WO-2009120419 A1 | 10/2009 |
| WO | WO-2010053244 A1 | 5/2010 |
| WO | WO-2010077141 A1 | 7/2010 |
| WO | WO-2012109221 A1 | 8/2012 |
| WO | WO-2014037008 A1 | 3/2014 |
| WO | WO-2014158011 A1 | 10/2014 |
| WO | WO-2015168020 A2 | 11/2015 |
| WO | WO-2015181308 A1 | 12/2015 |
| WO | WO-2016003465 A1 | 1/2016 |
| WO | WO-2016178676 A1 | 11/2016 |
| WO | WO-2018024654 A1 | 2/2018 |
| WO | WO-2018031540 A1 | 2/2018 |
| WO | WO-2018217198 A1 | 11/2018 |
| WO | WO-2018218033 A2 | 11/2018 |
| WO | WO-2018218033 A3 | 2/2019 |
| WO | WO-2019069992 A1 | 4/2019 |

OTHER PUBLICATIONS

"U.S. Appl. No. 15/988,794, Examiner Interview Summary mailed Aug. 16, 2019", 2 pgs.
"U.S. Appl. No. 15/988,794, Non Final Office Action mailed Apr. 19, 2019", 11 pgs.
"U.S. Appl. No. 15/988,794, Notice of Allowance mailed Nov. 20, 2019", 11 pgs.
"U.S. Appl. No. 15/988,794, PTO Response to Rule 312 Communication mailed Feb. 24, 2020", 2 pgs.
"U.S. Appl. No. 15/988,794, Response filed Aug. 15, 2019 to Non-Final Office Action mailed Apr. 19, 2019" 8 pgs.
"Back-End Value Enhanced through Patented Technology and Strategic Partnerships" retrieved from WWW.Valicor.com, (5 pages).
"International Application Serial No. PCT/US2017/034262, International Preliminary Report on Patentability mailed Dec. 5, 2019", 10 pgs.
"International Application Serial No. PCT/US2017/034262, International Search Report mailed Mar. 23, 2018", 7 pgs.
"International Application Serial No. PCT/US2017/034262, Invitation to Pay Additional Fees and Partial Search Report mailed Jan. 22, 2018", 13 pgs.
"International Application Serial No. PCT/US2017/034262, Written Opinion mailed Mar. 23, 2018", 8 pgs.
"International Application Serial No. PCT/US2018/034410, International Preliminary Report on Patentability mailed Dec. 5, 2019" 8 pgs.
"International Application Serial No. PCT/US2018/034410, International Search Report mailed Jan. 17, 2019", 6 pgs.
"International Application Serial No. PCT/US2018/034410, Written Opinion mailed Jan. 17, 2019", 6 pgs.
"Micro-fine silica treated with an organic silicone compound", DUMACIL® 100 FGK, Elementis Specialities, Apr. 2017, 1 page.
"Micro-fine silica treated with an organic silicone compound", DUMACIL® 300 FGK, Elementis Specialities, Apr. 2017, 1 page.
"Standard Test Method for Foaming Properties of Surface-Active Agenst1", Designation: D 1173-53, Reapproved 2001, 2 pages.
Corn Oil, Retrieved from 'https://corn.org/resources/?fwp_resource_type=pdf&fwp_search=Corn%20Oil', 2006, 24 pages.
Defoamer, Retrieved from 'https://en.wikipedia.org/wiki/Defoamer' on May 30, 2019, 5 pages.
Micro-fine silica treated with an organic silicone compound, DUMACIL® 100 FGK, Elementis Specialties, Apr. 2017, 1 page.
Standard Test Method for Foaming Properties of Surface-Active Agents1, Designation: D 1173-53, Reapproved J001, 2 pages.
Abdulkadir, M. et al., "Production and Refining of Corn Oil from Hominy Feed a By-Product of Dehulling Operation", ARPN Journal of Engineering an Applied Sciences, vol. 6, No. 4, Apr. 2017, 7 pages.
Bailey, Helen K., "Novel Uses of Vegetable Oil in Asphalt Mixtures", Ph.D Thesis, U. of East London, UK, (Sep. 2010), 366 pgs.
Bailey, Helen K., et al., "The Use of Vegetable Oil as a Rejuvenator for Asphalt Mixtures", 5th Eurasphalt and Eurobitume Congress, Istanbul, (Jun. 13-15, 2012), 10 pgs.
Bailey, Helen K., et al., "The Use of Vegetable Oil in Asphalt Mixtures, in the Laboratory and Field", 5th Eurasphalt and Eurobitume Congress, Istanbul, (Jun. 13-15, 2012), 12 pgs.
Bennert, Thomas, "Fatigue Performance of Re-Refined Engine Oil Bottoms (REOB) Modified Asphalt—A Laboratory Study", 95th Annual Transportation Research Board Meeting, (Jan. 2016), 26 pgs.
D'Amore, Tony, et al., "A Study of Ethanol Tolerance in Yeast", Critical Reviews in Biotechnology, vol. 9:4, (1990), 18pgs.
D'Amore, Tony, et al., "Ethanol tolerance of yeast", Enzyme and Microbial Technology, vol. 9:6, (Jun. 1987), 9 pgs.
European Search Report for the related Application No. 18806452. 1, PCT/US201803441, dated Jan. 2, 2021, 9 pages.
Friedrich, J.P. et al., "Properties and Processing of Corn Oils Obtained by Extraction With Supercritical Carbon Dioxide", JAOCS, vol. 61, No. 12, 1984, (3 pages).
Golalipour, Amir, "Investigation of the Effect of Oil Modification on Critical Characteristics of Asphalt Binders", PhD Dissertation, U. of Wisconsin—Madison, [Online]. Retrieved from the Internet: URL: http: www.asphaltinstitute. org wp-content uploads Thickness_MixPhDDissertationDocument-Fi nal-AG2.pdf, (2013), 204 pgs.
Hughes, Stephen R, "Production of Candida antarctica lipase B gene open reading frame using automated PCR gene assembly protocol on robotic workcell and expression in an ethanologenic yeast for use as resin-bound biocatalyst in biodiesel production", Journal of the Association for Lab. Automation, 16(1), {Feb. 2011), 17-37.
International Search Report for International Application No. PCT/2019/036578, mailed on Oct. 11, 2019, 5 pages.
International Search Report for International Application No. PCT/US2019/036578, mailed on Oct. 11, 2019, 5 pages.
International Search Report, for International Application No. PCT/US2019/017286, mailed May 14, 2019 (6 pages).
Japir, Abd Al-Wali er al., "Separation of Free Fatty Acids from High Free Fatty Acid Crude Palm Oil Using Short-Path Distillation", The

(56) References Cited

OTHER PUBLICATIONS

2016 UKM FST Postgraduate Colloquium, AIP Conf. Proc. 1784, 030001-1-030001-8, 2016, (9 pages).
Layfield, J. Blake, et al., "What Brewers Should Know About Viability, Vitality, and Overall Brewing Fitness: A Mini-Review" Master Brew. Assoc. Am., 52:3, (2015), 9 pgs.
LCI Corporation, "Short Path Evaporation", retrieved from https://lcicorp.com/short_path_evaporators/short_path_evaporator, (2 pages).
Meng, et al., "Two-step synthesis of fatty acid ethyl ester from soybean oil catalyzed by Yarrowia lipolytica lipase", Biotechnology for Biofuels, vol. 4, No. 6, (2011), 9 pgs.
Mogawer, Walaa S., "Evaluating the effect of rejuvenators on the degree of blending and performance of high RAP, RAS, and RAP RAS mixtures", Road Materials and Pavement Design, vol. 14, No. 2, (2013), 29 pgs.
Moghaddam, Taher Baghaee, et al., "The use of rejuvenating agents in production of recycled hot mix asphalt: A systematic review", Construction and Building Materials 114, (2016), 805-816.
Moreau, Robert A., "Changes in Lipid Composition During Dry Grind Ethanol Processing of Corn", Journal of the American Oil Chemist's Society, vol. 88, {Mar. 2010).
Saini, Ramesh Kumar et al., "Carotenoid extraction methods: A review of recent developments", Food Chemistry, No. 240, pp. 90-103, 2018, (14 pages).
Seidel, Joseph C., "Rheological characterization of asphalt binders modified with soybean fatty acids", Construction and Building Materials, vol. 53, {Feb. 2014), 324-332.
Skaliotis, Leon, "Short Path to Premium Quality Oils," Food Marketing & Technology, Feb. 2011, pp. 23-26, (4 pages).
Unpublished Utility U.S. Appl. No. 16/880,172, filed May 21, 2020 (No Copy Enclosed).
Unpublished Utility U.S. Appl. No. 17/063,009, filed Oct. 5, 2020 (No Copy Enclosed).
Van Den Berg, Corjan, "Simultaneous clostridial fermentation, lipase-catalyzed esterification, and ester extraction o enrich diesel with butyl butyrate", Biotechnology and Bioengineering, vol. 110, No. 1, {Jan. 2013), 6 pgs.
W. R. Gibbons et al: "Integrated biorefineries with engineered microbes and high-value co- products for profitable biofuels production", In Vitro Cellular & Development Biology. Plant, vol. 45, No. 3, Apr. 3, 2009 (Apr. 3, 2009), pp. 218-228, XP055270849, US ISSN: 1054-5476, DOI: 10.1007/s11627-009-9202-1, 10 pages.
Winkler, Jill K., "Phytosterol and Tocopherol Components in Extracts of Corn Distiller's Dried Grain", J_ Agric. Food Chem., 55(16), {Jul. 2007), 6482-6486.
Winkler-Moser, Jill K., "Antioxidant Activity of Phytochemicals from Distillers Dried Grain Oil", Journal of the American Oil Chemist's Society, vol. 86, {Mar. 2009), 1073-1082.
Winkler-Moser, Jill K., et al., "Composition and oxidative stability of crude oil extracts of corn germ and distillers grains", Industrial Crops and Products 33, (2011), 572-578.
Yusoff et al. "Comparison of Fatty Acid Methyl and Ethyl Esters as Biodiesel Base Stock: a Review on Processing and Production Requirements", J Am Oil Chem Soc (2014) 91: 525-531; DOI: 10.1007/s11746-014-2443-0 (Year: 2014).
Zaumanis, Martins, "Influence of six rejuvenators on the performance properties of Reclaimed Asphalt Pavement RAP) binder and 100% recycled asphalt mixtures", Construction and Building Materials, vol. 71, {Nov. 2014), 14 pgs.
Zaumanis, Martins, et al., "Use of Rejuvenators for Production of Sustainable High Content RAP Hot Mix Asphalt", The XXVIII International Baltic Road Conference, (2013), 10 pgs.

\* cited by examiner

METHODS OF PRODUCING VEGETABLE OILS WITH LOW MINERALS, METALS, OR OTHER CONTAMINANTS

CROSS-REFERENCE TO RELATED APPLICATIONS

This application is a continuation-in-part of U.S. application Ser. No. 17/124,863, filed on Dec. 17, 2020, now U.S. Pat. No. 11,421,109, which is a continuation of U.S. application Ser. No. 15/988,836, filed on May 24, 2018, now U.S. Pat. No. 10,899,928, which is a continuation of and claims the benefit of priority to PCT Application No. PCT/US2017/034262, filed on 24 May 2017. This application is also a continuation-in-part of U.S. application Ser. No. 17/026,771, filed on Sep. 21, 2020, now U.S. Pat. No. 11,530,369, which is a continuation of U.S. application Ser. No. 16/437,960, filed on Jun. 11, 2019, now U.S. Pat. No. 10,851,327, which claims the benefit of U.S. Provisional Application No. 62/683,347, filed Jun. 11, 2018, U.S. Provisional Application No. 62/814,006 filed Mar. 5, 2019, and U.S. Provisional Application No. 62/817,789, filed Mar. 13, 2019. This application also claims the benefit of U.S. Provisional Application No. 63/082,712, filed Sep. 24, 2020. This application also is a continuation-in-part of U.S. application Ser. No. 16/775,822 filed Jan. 29, 2020, now U.S. Pat. No. 11,104,922, which is a continuation of U.S. patent application Ser. No. 15/988,794, filed May 24, 2018, now U.S. Pat. No. 10,899,928, which claims the benefit of priority of U.S. Provisional Application No. 62/510,551, filed May 24, 2017. All of the above applications are incorporated herein by reference in their entirety.

BACKGROUND

In a conventional ethanol plant, corn is most commonly used as a feedstock and ethanol is produced from starch contained within the corn. Distiller's corn oil (DCO) is a by-product of the ethanol production. In such process, corn kernels are cleaned and milled to prepare starch-containing material for processing. Corn kernels can also be fractionated to separate the starch-containing material (endosperm) from other matter (such as fiber and germ). The starch-containing material may be slurried with water and liquefied to facilitate saccharification, where the starch is converted into sugar (glucose), and then fermentation, where the sugar is converted by yeast into ethanol. The fermentation product is called beer, which includes a liquid component of ethanol, water, and soluble components, and a solids component of unfermented particulate matter (among other things). The fermentation product is sent to a distillation system where the fermentation product is distilled and dehydrated into ethanol. The byproduct stream from the distillation unit after ethanol has been recovered is referred to as whole stillage, which includes suspended solids, dissolved solids, water, and the corn oil. The whole stillage stream is separated, typically by decanting centrifuges, into a thin stillage stream and a wet cake stream. The wet cake stream has a higher concentration of solids than whole stillage and is typically of a relatively high viscosity sludge-like consistency. The thin stillage has a lower concentration of suspended solids than whole stillage and is typically of a relatively low viscosity liquid stream. The solids concentration of the thin stillage stream can be increased in an evaporation step where water is evaporated from the thin stillage. Concentrated thin stillage is referred to as syrup, which contains an increased concentration of corn oil that can be sold as distiller's corn oil (DCO).

However, DCO produced as a coproduct of ethanol production contains multiple contaminants in levels that often exceed acceptable limits for its use as feedstock in various further processes, such as biofuel production. Minerals or metals in the oil, such as alkali and/or alkaline earth metals, chlorides, and/or phosphorus ions/compounds tend to be undesired and some components may form soaps with fatty acids produced throughout the ethanol production process. When these metals and/or minerals are present in feedstocks for biofuels, they can poison catalysts used in the renewable fuel production. Therefore, DCO feedstock, in this instance, must be refined by biofuel producers when used for renewable fuel production to ensure metals and minerals are below levels that are detrimental to the biofuel catalysts. Such downstream refinement of DCO, however, tends to require large capital investments and/or unit operations that are operationally intensive. Processes typically used for food grade oil may be used for such refinement, but such processing tends to be inefficient for biofuel producers.

SUMMARY

In one approach or embodiment, a process for reducing the content of ions in a vegetable oil obtained from fermentation of ground vegetable material is described in this disclosure. In one aspect, the process includes fermenting a sugar obtained from a ground vegetable material to produce ethanol in a composition that further includes one or more of water, residual ground vegetable material, and vegetable fat. About 0.001 to about 0.5% w/w of an exogenous esterase based on the total weight of the vegetable fat is added before, during, or after the fermenting (or in alternative approaches, about 2 to about 20 liters/550,000 gallon fermenter of the exogenous esterase is added). Then, vegetable oil is isolated from a portion of the composition in a manner effective to produce an isolated vegetable oil having ions (as discussed herein) but no more than about 20 ppm of ions.

In other approaches or embodiments, the process of the previous paragraph may include or may be combined with optional embodiments, features, steps, or limitations in any combination. These optional embodiments, features, steps, or limitations may be one or more of: wherein the isolating includes combining at least a portion of the vegetable fat from the composition with water to form a mixture and recovering the isolated vegetable oil from the mixture by gravity separation; and/or wherein the gravity separation is through one or more settling tanks; and/or wherein about 0.1 to about 30% w/w water is combined with the portion of vegetable fat; and/or wherein about 2 to about 20% w/w water is combined with the portion of vegetable fat; and/or wherein the isolating further includes separating the portion of vegetable fat from the composition into an oil fraction and an aqueous portion by applying a first centrifugal force to the portion of vegetable fat, wherein the oil fraction includes the portion of vegetable fat; adjusting a pH of the oil fraction to form a pH adjusted oil fraction; and separating the pH adjusted oil fraction into an oil composition and a second aqueous portion by applying a second centrifugal force, wherein the oil composition includes the portion of vegetable fat; and/or wherein the pH is adjusted to a range of about 3 to about 7; and/or wherein the pH is adjusted to a range of about 3.5 to about 6; and/or wherein the pH is adjusted to a range of about 7 to about 10; and/or wherein the isolating further includes separating the portion of vegetable fat of the composition into an oil fraction and an aqueous portion through addition of a demulsifying agent, wherein the oil fraction includes the portion of vegetable fat; and/or wherein the demulsifying agent is selected from silica, silicates, lecithin, wax, polyethylene, resins, ethyoxylated fatty mono-, di-, or triglycerides or ethoxylated saccharide esters, polyglycerols, polyglycol, polyadduct of polyglycol and alkenyl succinic acid anhydride, polyester of polyglycol, alkenyl succinic anhydride polyester, block copolymer of propylenoxide and ethylenoxide, polyglycerol, polyester of poly-a-olefin phenol-formaldehyde resins, epoxy resins, polyethyleneimines, polyamines, di-epoxides, polyols, dendrimers thereof, or combinations thereof; and/or wherein the gravity separation is for about 10 minutes to about 24 hours and at a mixture temperature of about 0° C. to about 100° C.; and/or wherein the gravity separation is for about 1 to about 16 hours; and/or wherein the mixture temperature is about 50 to about 80° C.; and/or wherein the gravity separation is for about 1 to about 24 hours and the mixture is maintained at a temperature of about 50 to about 80° C. for about 4 to about 24 hours of the gravity separation; and/or wherein the isolating includes recovering the isolated vegetable oil from the mixture by gravity separation; and/or wherein the gravity separation is for about 1 to about 24 hours and the mixture is maintained at a temperature of about 50 to about 80° C. for about 4 to about 24 hours of the gravity separation; and/or wherein the fermenting is at a pH of about 3 to about 6; and/or wherein the fermenting is at a temperature of about 25° C. to about 40° C.; and/or wherein the exogenous esterase is added during the fermenting; and/or wherein the isolated vegetable oil has about 50 to about 95% less ions than an isolated vegetable made by the same process but without the exogenous esterase; and/or wherein the ions are selected from one or more of from lithium, sodium, magnesium, potassium, calcium, phosphorus, or combinations thereof; and/or wherein the isolated vegetable oil has no more than about 10 ppm of ions; and/or wherein the isolated vegetable oil has no more than about 20 ppm of chlorides.

DETAILED DESCRIPTION

Figure 1:
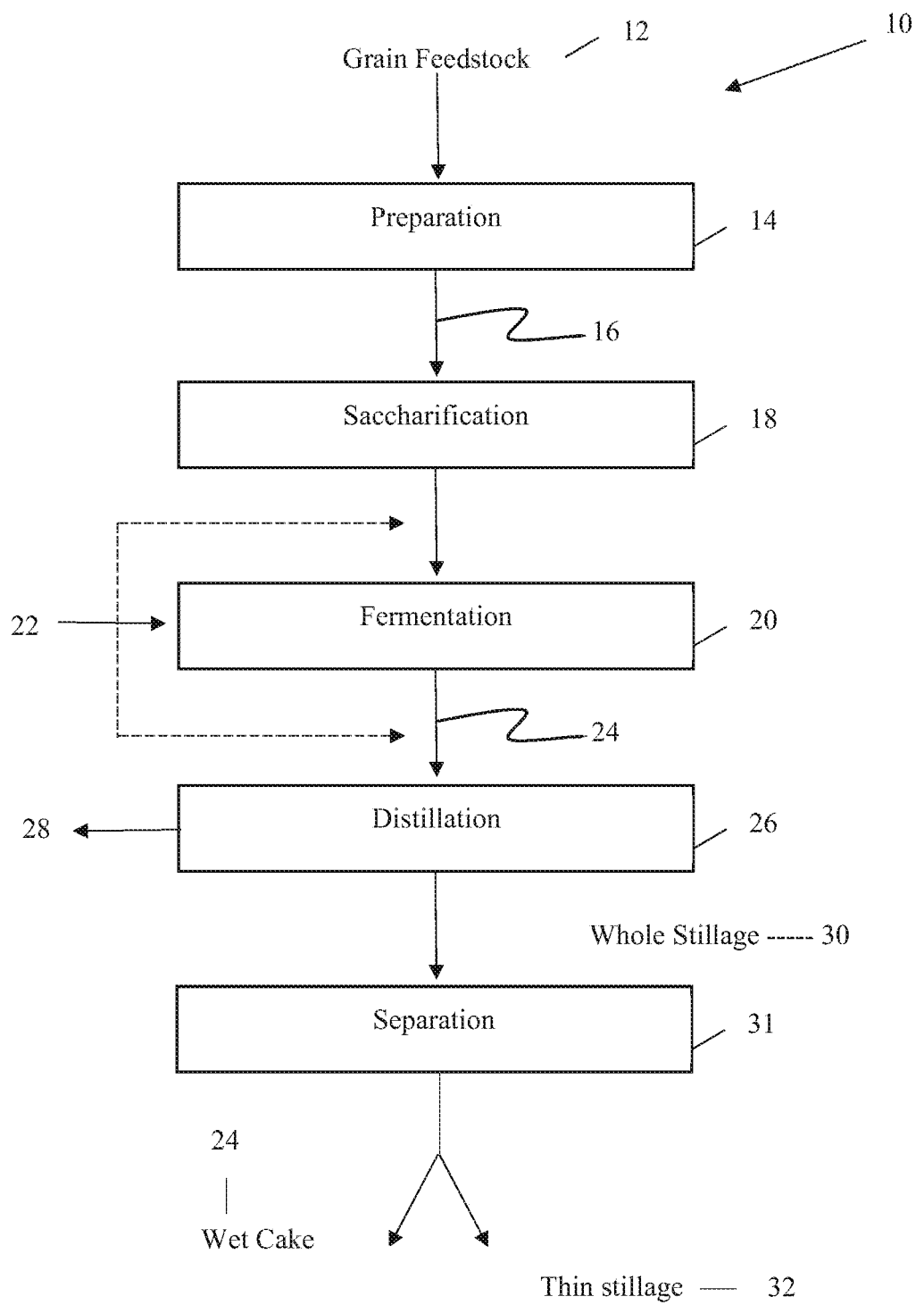
FIG. 1 is a schematic block flow diagram of a process for producing ethanol from a vegetable material such as corn.

The present disclosure describes methods for reducing the content of minerals, metals, ions, and/or other undesirable contaminants in vegetable oil, such as corn oil, obtained from fermentation of ground vegetable material. In one aspect, the methods herein produce distiller's corn oil having low amounts of minerals, metals, ions, and/or other contaminants rendering the corn oil more suitable for various further uses, such as biofuel production, with little to no additional refining. In one approach, the methods include fermenting a sugar obtained from a ground vegetable material to produce a composition that includes ethanol and one or more of water, residual ground vegetable material, and vegetable fat. An exogenous esterase is added before, during, or after the fermenting in amounts effective to lower the amounts of minerals, metals, ions, and/or other contaminants in the vegetable oil subsequently recovered from the composition. In some approaches, about 0.001 to about 0.5% w/w of the exogenous esterase, based on the total weight of the vegetable fat, is added. In other approaches, about 2 to about 20 liters of the exogenous esterase is added per 550,000 gallons of the fermenter. Thereafter, a vegetable oil is isolated from a portion of the composition in a manner effective to produce an isolated vegetable oil, such as an isolated distiller's corn oil, having minerals, metals, and/or ions but no more than about 20 ppm of the minerals, metals, and/or ions, and in other approaches, no more than 10 ppm of the minerals, metals, and/or ions.

In one approach, the isolating includes combining at least a portion of the vegetable fat from the fermented composition with water to form a mixture and recovering the isolated vegetable oil from the mixture by gravity separation, such as but not limited to, one or more settling tanks. In another approach, the isolating further includes first separating the portion of vegetable fat from the composition into an oil fraction and an aqueous portion by applying a first centrifugal force to the portion of vegetable fat, wherein the oil fraction includes the portion of vegetable fat; adjusting a pH of the oil fraction to form a pH adjusted oil fraction; and separating the pH adjusted oil fraction into an oil composition and a second aqueous portion by applying a second centrifugal force, wherein the oil composition includes the portion of vegetable fat. The oil composition may be further isolated by the gravity separation as needed. In yet further approaches, the isolating may include separating the portion of vegetable fat of the composition into an oil fraction and an aqueous portion through addition of a demulsifying agent combined with optional further isolation using centrifuge, water washing, and/or gravity separation.

Definitions

Unless defined otherwise, all technical and scientific terms used herein have the same meaning as commonly understood by one of ordinary skill in the art to which this invention belongs. As used herein the following terms have the following meanings.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

As used herein, the term "about" modifying any amount refers to the variation in that amount encountered in real world conditions of producing sugars and ethanol, e.g., in the lab, pilot plant, or production facility. For example, an amount of an ingredient employed in a mixture when modified by "about" includes the variation and degree of care typically employed in measuring in an ethanol production plant or lab. For example, the amount of a component of a product when modified by "about" includes the variation between batches in an ethanol production plant or lab and the variation inherent in the analytical method. Whether or not modified by "about," the amounts include equivalents to those amounts. Any quantity stated herein and modified by "about" can also be employed in the present invention as the amount not modified by "about." For instance, the term "about" when used before a numerical designation, e.g., temperature, time, amount, and concentration, including range, indicates approximations which may vary by (+) or (−) 10%, 5% or 1%.

As used herein, the term "unrefined vegetable oil" refers to vegetable oil which has not been subjected to a refining process, such as alkali refining or physical refining (i.e., distillation, deodorization, bleaching, etc.).

As used herein, the term "oil" generally refers to the a glyceride containing composition that is the final, recovered product in liquid form, and the term "fat" generally refers to a glyceride containing composition upstream to the final, recovered product and fat may be in solid and/or liquid form, emulsified, and/or complexed with or bound to other grain based materials.

As used herein, the term "free fatty acid" (FFA) refers to an unesterified fatty acid, or more specifically, a fatty acid having a carboxylic acid head and a saturated or unsaturated unbranched aliphatic tail (group) of from 4 to 28 carbons. The term "aliphatic" has it generally recognized meaning and refers to a group containing only carbon and hydrogen atoms which is straight chain, branched chain, cyclic, saturated or unsaturated but not aromatic. In contrast, a fatty acid ester, such as a fatty acid ethyl ester (FAEE), is an esterified (not free) fatty acid. For example, FAEE is a fatty acid esterified with ethanol.

As used herein, the term "moisture content" refers to the amount of water and other soluble components in the oil composition. The moisture in the vegetable oil composition contains alkali and/or alkaline metal, and may contain other soluble components, such as volatile material including hexane, ethanol, methanol, and the like as well as minerals, inorganic chlorides, and other chlorides.

As used herein, the term "ions" refers to metal and/or non-metal ions or anions.

As used herein, the term "an alkali metal ion" refers to one or more metal ion of Group 1 of the periodic table (e.g., lithium (L+), sodium (Na+), potassium (K+), etc.). As used herein, the term "an alkaline metal ion" refers to a metal ion of Group 2 of the periodic table (e.g., magnesium (Mg2+), calcium (Ca2+), etc.). As used herein, the terms "non-metal" or "non-metal ions" refers to minerals such as non-metals of Group 15 of the periodic table and may include at least phosphorous and/or phosphorus compounds.

As used herein, the term "insoluble" refers to material in the oil which is not solvated by the aqueous portion, the oil or the moisture content within the oil.

As used herein, the term "unsaponifiables" refers to components of the oil that do not form soaps when blended with a base, and includes any variety of possible non-triglyceride materials. This material can act as contaminants during biodiesel production. Unsaponifiable material can significantly reduce the end product yields of the oil composition and can, in turn, reduce end product yields of the methods disclosed herein.

As used herein, the term "peroxide value" refers to the amount of peroxide oxygen (in millimoles) per 1 kilogram of fat or oil and is a test of the oxidation of the double bonds of the oils. The peroxide value is determined by measuring the amount of iodine (I—) via colorimetry which is formed by the reaction of peroxides (ROOH) formed in the oil with iodide via the following equation: $2I^- + H_2O + ROOH \rightarrow ROH + 2OH^- + I_2$.

As used herein, the term "oxidative stability index value" refers to the length of time the oil resists oxidation at a given temperature. Typically, the oxidation of oil is slow, until the natural resistance (due to the degree of saturation, natural or added antioxidants, etc.) is overcome, at which point oxidation accelerates and becomes very rapid. The measurement of this time is the oxidative stability index value.

As used herein, the term "vegetable fermentation residue" refers to the residual components of a vegetable fermentation process after the ethanol has been recovered, typically via distillation. Typically, the vegetable fermentation residue comprises water, any residual starch, enzymes, etc.

As used herein, the term "syrup" refers to the viscous composition which is provided by the evaporation of the thin stillage.

As used herein, the term "base" refers to a compound or composition which raises the pH of an aqueous solution. Suitable bases for use in this invention include, but are not limited to, sodium hydroxide, potassium hydroxide, calcium hydroxide, or spent alkali wash solution.

As used herein, the term "alkali wash solution" refers to the basic solution which is used to disinfect the fermenter after the fermentation process has been completed. The alkali wash solution typically comprises sodium hydroxide.

As used herein, the phrase "without cooking" refers to a process for converting starch to ethanol without heat treatment for gelatinization and dextrinization of starch using alpha-amylase. Generally, for the process of the present invention, "without cooking" refers to maintaining a temperature below starch gelatinization temperatures, so that saccharification occurs directly from the raw native insoluble starch to soluble glucose while bypassing conventional starch gelatinization conditions. Starch gelatinization temperatures are typically in a range of 57° C. to 93° C. depending on the starch source and polymer type. In the method of the present invention, dextrinization of starch using conventional liquefaction techniques is not necessary for efficient fermentation of the carbohydrate in the grain.

As used herein, the phrase "plant material" refers to all or part of any plant (e.g., cereal grain), typically a material including starch. Suitable plant material includes grains such as maize (corn, e.g., whole ground corn), sorghum (milo), barley, wheat, rye, rice, and millet; and starchy root crops, tubers, or roots such as sweet potato and cassava. The plant material can be a mixture of such materials and byproducts of such materials, e.g., corn fiber, corn cobs, stover, or other cellulose and hemicellulose containing materials such as wood or plant residues. Suitable plant materials include corn, either standard corn or waxy corn.

As used herein, the terms "saccharification" and "saccharifying" refer to the process of converting starch to smaller polysaccharides and eventually to monosaccharides, such as glucose. Conventional saccharification uses liquefaction of gelatinized starch to create soluble dextrinized substrate which glucoamylase enzyme hydrolyzes to glucose. In the present method, saccharification refers to converting raw starch to glucose with enzymes, e.g., glucoamylase and acid fungal amylase (AFAU). In one embodiment, the raw starch is not subjected to conventional liquefaction and gelatinization to create a conventional dextrinized substrate. In other embodiments, the raw starch is subjected to liquefaction and gelatinization form a dextrinized substrate.

As used herein, a unit of acid fungal amylase activity (AFAU) refers to the standard Novozymes units for measuring acid fungal amylase activity. The Novozymes units are described in a Novozymes technical bulletin SOP No.: EB-SM-0259.02/01. Such units can be measured by detecting products of starch degradation by iodine titration. 1 unit is defined as the amount of enzyme that degrades 5.260 mg starch dry matter per hour under standard conditions.

As used herein, a unit of glucoamylase activity (GAU) refers to the standard Novozymes units for measuring glucoamylase activity. The Novozymes units and assays for determining glucoamylase activity are described in a publicly available Novozymes technical bulletin.

As used herein, a unit of amyloglucosidase activity (AGU) refers to the standard Novozymes units for measuring amyloglucosidase activity. The Novozymes units are described in a Novozymes technical bulletin SOP No.: EB-SM-0131.02/01. Such units can be measured by detecting conversion of maltose to glucose. The glucose can be determined using the glucose dehydrogenase reaction. 1 unit is defined as the amount of enzyme that catalyzes the conversion of 1 mmol maltose per minute under the given conditions.

Long-chain lipase units (LCLU) refers to the standard Novozymes units for measuring lipase activity. These units are described in patent application, WO 2015/181,308 A1. Such units can be measured by detecting the hydrolysis product, p-nitrophenol (PNP), of PNP-palmitate and measuring its resulting absorbance at 405 nm. 1 unit is defined as the amount of enzyme to release 1 µmol of PNP per minute. However, as used herein, the amount of lipase dosed in fermentation was based upon the total weight of fat within the corn present in fermentation (e.g., 0.4% lipase by weight of corn fat).

Exemplary Methods for Converting Starch to Ethanol and Recovering Byproducts

The present disclosure provides methods for producing vegetable oil as a byproduct of ethanol production where the vegetable oil has low levels of contaminants, such as for example, low levels of contaminants including one or more of minerals, metals, ions, or other contaminants that are detrimental to catalysts used in biofuel production. The methods preferably produce distiller's corn oil having low levels of such contaminants. The methods herein convert starch from plant material to ethanol and recover the vegetable oil as a byproduct. The lower levels of contaminants in the recovered vegetable oil may be the result of fermentation, which may be enhanced by adding an exogenous esterase, combined with select methods to isolate the vegetable oil byproduct. In general, the methods herein prepare the starting plant material for saccharification, convert the prepared plant material to sugars through saccharification with or without cooking, ferment the sugars to ethanol, recover ethanol, and isolate the vegetable oil byproduct having the low levels of contaminants. Each of these process steps will be discussed further below.

Turning to FIG. 1, a general method 10 of ethanol production is illustrated. The methods include grain preparation 14, saccharification 18, fermentation 20, distillation 26, and initial separations 31. First, the grain feedstock or plant material 12 is prepared 14 for saccharification by any a variety of methods, such as by grinding through a ball mill, a roller mill, a hammer mill, or another mill known for grinding vegetable material. The use of emulsion technology, rotary pulsation, and other means of particle size reduction can be employed to increase surface area of plant material while raising the effectiveness of flowing the liquefied media. The prepared plant material 16 can be referred to as being or including raw starch.

A fine grind exposes more surface area of the starting vegetable material, and can aid in the saccharification and fermentation. In one approach, the vegetable material is ground so that a substantial portion of the ground material fits through a sieve with a 0.1 to 0.5 mm screen. In approaches, about 35% or more of the ground vegetable material can fit through a sieve with a 0.1 to 0.5 mm screen, in other approaches, about 50% or more or up to about 90% of the material fits through such screen. In other embodiments, about 35 to about 70% of the ground vegetable material can fit through a sieve with a 0.1 to 0.5 mm screen. In some embodiments, the ground plant material can be mixed with liquid forming a composition having about 20 to about 50 weight %, about 25 to about 45 weight %, about 30 to about 40 weight % dry reduced plant material. As used herein, weight % of reduced plant material in a liquid refers to the percentage of dry reduced plant material or dry solids in the liquid. Preferably, the grain feedstock is corn.

Next, the process converts the reduced plant or vegetable material to sugars. This conversion is by saccharifying 18 the reduced plant material with an enzyme preparation, such as a saccharifying enzyme composition. The saccharifying enzyme composition can include a variety of enzymes suitable for converting the reduced plant material to fermentable sugars, such as amylases (α-amylase and/or glucoamylase). In an embodiment, saccharification is conducted at a pH of about 6.0 or less, about 3.0 to about 6.0, about 3.5 to about 6.0, about 4.0 to about 5.0, about 4.0 to about 4.5, or about 4.5 to about 5.0, and the saccharifying can be conducted with or without cooking. In an embodiment, saccharification is conducted at a temperature of about 25 to about 40° C. or about 30 to about 35° C.

Saccharification can employ a variety of enzyme sources or compositions to produce fermentable sugars from the reduced plant material. In one approach, the saccharifying enzyme composition may include an amylase, such as an alpha amylase or acid fungal amylase, or a glucoamylase. In other embodiments, the saccharifying can be carried out employing quantities of the saccharifying enzyme composition selected to maintain low concentrations of dextrin in the fermentation broth. For example, the process can employ quantities of saccharifying enzyme composition selected to maintain maltotriose (DP3) at levels at or below about 0.2 wt-% or at or below about 0.1 wt-%. For example, the present process can employ quantities of saccharifying enzyme composition selected to maintain dextrin with a degree of polymerization of 4 or more (DP4+) at levels at or below about 1 wt-% or at or below about 0.5 wt %. For maintaining low levels of maltotriose and/or DP4+, suitable levels of acid fungal amylase and glucoamylase include about 0.3 to about 3 AFAU/gram dry solids reduced plant material (such as dry solids corn or DSC) of acid fungal amylase and about 1 to about 2.5 AGU per gram dry solids reduced plant material (DSC) of glucoamylase. In an embodiment, the reaction mixture includes about 1 to about 2 AFAU/gram dry solids reduced plant material (DSC) of acid fungal amylase and about 1 to about 1.5 AGU per gram dry solids reduced plant material (DSC) of glucoamylase.

In another embodiment, saccharifying can be carried out employing quantities of the saccharifying enzyme composition selected to maintain low concentrations of maltose in the fermentation broth. For example, the present process can employ quantities of the saccharifying enzyme composition to maintain maltose at or below about 0.3 wt %. For maintaining low levels of maltose, suitable levels of acid fungal amylase and glucoamylase include about 0.3 to about 3 AFAU/gram dry solids reduced plant material (DSC) of acid fungal amylase and about 1 to about 2.5 AGU per gram dry solids reduced plant material (DSC) of glucoamylase. In an embodiment, the reaction mixture includes about 1 to about 2 AFAU/gram dry solids reduced plant material (DSC) of acid fungal amylase and about 1 to about 1.5 AGU per gram dry solids reduced plant material (DSC) of glucoamylase.

In certain embodiments, the method employs α-amylase. The α-amylase can be one produced by fungi. The α-amylase can be one characterized by its ability to hydrolyze carbohydrates under acidic conditions. An amylase produced by fungi and able to hydrolyze carbohydrates under acidic conditions is referred to herein as acid fungal amylase, and is also known as an acid stable fungal α-amylase, Acid fungal amylase can catalyze the hydrolysis of partially hydrolyzed starch and large oligosaccharides to sugars such as glucose. The acid fungal amylase that can be employed in the process can be characterized by its ability to aid the hydrolysis of raw or native starch, enhancing the saccharification provided by glucoamylase. In an embodiment, the acid fungal amylase produces more maltose than conventional (e.g., bacterial) alpha-amylases.

Suitable acid fungal amylase can be isolated from any of a variety of fungal species, including *Aspergiilus, Rhizopus, Mucor, Candida, Coriolus, Endothia, Enthomophtora, Irpex, Penicillium, Sclerotium* and *Torulopsis* species. In an embodiment, the acid fungal amylase is thermally stable and is isolated from *Aspergillus* species, such as *A. niger, A saitoi* or *A. oryzae*, from *Mucor* species such as *M. pusiltus* or *M. miehei*, or from Endothia species such as *E. parasitica*. In an embodiment, the acid fungal amylase is isolated from *Aspergillus niger*. The acid fungal amylase activity can be supplied as an activity in a glucoamylase preparation, or it can be added as a separate enzyme. A suitable acid fungal amylase can be obtained from Novozymes, for example in combination with glucoamylase.

The amount of acid fungal amylase employed in the present process can vary according to the enzymatic activity of the amylase preparation. Suitable amounts include about 0.1 to about 10 acid fungal amylase units (AFAU) per gram of dry solids reduced plant material (DSC). In an embodiment, the reaction mixture can include about 0.3 to about 3 AFAU/gram dry solids reduced plant material (DSC). In an embodiment, the reaction mixture can include about 1 to about 2 AFAU/gram dry solids reduced plant material (DSC).

In yet other embodiments, the methods can employ a glucoamylase, which is also known as amyloglucosidase and has the systematic name 1,4-alpha-D-glucan glucohydrolase (E.C. 3.2.1.3). Glucoamylase refers to an enzyme that removes successive glucose units from the non-reducing ends of starch. For example, certain glucoamylases can hydrolyze both the linear and branched glucosidic linkages of starch, amylose, and amylopectin. A variety of suitable glucoamylases are known and commercially available. For example, suppliers such as Novozymes and Genencor provide glucoamylases. The glucoamylase can be of fungal origin.

The amount of glucoamylase employed in the present process can vary according to the enzymatic activity of the amylase preparation. Suitable amounts include about 0.1 to about 6.0 glucoamylase units (AGU) per gram dry solids reduced plant material (DSC). In an embodiment, the reaction mixture can include about 1 to about 3 AGU per gram dry solids reduced plant material (DSC). In an embodiment, the reaction mixture can include about 1 to about 2.5 AGU per gram dry solids reduced plant material (DSC). In an embodiment, the reaction mixture can include about 1 to about 2 AGU per gram dry solids reduced plant material (DSC). In an embodiment, the reaction mixture can include about 1 to about 1.5 AGU per gram dry solids reduced plant material (DSC). In an embodiment, the reaction mixture can include about 1.2 to about 1.5 AGU per gram dry solids reduced plant material (DSC).

The process then ferments 20 the sugars obtained from the saccharified and reduced plant material to ethanol. Fermenting can be effected by a microorganism, such as yeast. In an embodiment, fermentation is conducted at a pH of about 6 or less or about 4.5 to about 5. The present methods may vary the pH as needed. For instance, fermentation can include filling the fermenter at pH of about 3 to about 4.5 during the first half of fill and at a pH of about 4.5 to about 6 during the second half of the fermenter fill cycle. Fermentation is conducted at a temperature of about 25 to about 40° C. or about 30 to about 35° C. In one embodiment, the temperature is decreased from about 40° C. to about 30° C. or to about 25° C., or from about 35° C. to about 30° C. during the first half of the fermentation, and the temperature is held at the lower temperature for the second half of the fermentation. In other embodiments, fermentation is conducted for about 24 to about to about 150 hours, for example, for about 47 to about 96 hours.

Any of a variety of yeasts can be employed as the yeast starter in the present process. Suitable yeasts include any of a variety of commercially available yeasts, such as commercial strains of *Saccharomyces cerevisiae*. Suitable strains include "Fali" (Fleischmann's), Thermosac (Alltech), Ethanol Red (LeSafre), BioFerm AFT (North American Bioproducts), and the like. In an embodiment, the yeast is selected to provide rapid growth and fermentation rates in the presence of high temperature and high ethanol levels. In an embodiment, Fali yeast has been found to provide good performance as measured by final alcohol content of greater than 17% by volume. The amount of yeast starter employed is selected to effectively produce a commercially significant quantity of ethanol in a suitable time, e.g., less than 75 hours.

Yeast can be added to the fermentation by any of a variety of methods known for adding yeast to fermentation processes. For example, yeast starter can be added by as a dry batch, or by conditioning/propagating. In an embodiment, yeast starter is added as a single inoculation. In an embodiment, yeast is added to the fermentation during the fermenter fill at a rate of 5 to 100 pounds of active dry yeast (ADY) per 100,000 gallons of fermentation mash. In an embodiment, the yeast can be acclimated or conditioned by incubating about 5 to 50 pounds of ADY per 10,000 gallon volume of fermenter volume in a prefermenter or propagation tank. Incubation can be from 8 to 16 hours during the propagation stage, which is also aerated to encourage yeast growth. The prefermenter used to inoculate the main fermenter can be from 1 to 10% by volume capacity of the main fermenter, for example, from 2.5 to 5% by volume capacity relative to the main fermenter.

In certain embodiments, the methods herein also dose an exogenous esterase 22 either before, during, or after the fermentation as shown by the optional injections in FIG. 1. In one approach, the exogenous esterase is assigned to IUB EC 3.1.1.1 or EC 3.1.1.3. The exogenous esterase may be a lipase or an esterase defined by EC 3.1.1.1 (a carboxylic-ester hydrolase) or 3.1.1.3 (a triacylglycerol lipase). Exemplary exogenous esterases include but are not limited to lipases such as those from plant, fungi, yeast or bacteria, e.g., lipases from filamentous fungi, such as those of genera *Rhizopus, Mucor, Geotrichum, Aspergillus, Fusarium* and *Penicillium*, as well as bacteria such as *Bacillus coagulans, Bacillus stearothermophilus, Bacillus alcalophilus Pseudomonas* sp., *Pseudomonas aeruginosa, Burkholderia multivorans, Burkholderia cepacia, Staphylococcus caseolyticus*, and yeast such as *Candida rugosa. Candida fropicalis, Candida antarctica, Candida cylindracea, Candida parapsilopsis, Candida deformans, Candida curvata, Candida valida, Yarrovvia lipolytica, Rhodotorula giutinis. Rhodotoruia pilimomae, Pichia bispora, Pichia mexicana, Pichia sivicola, Saccharomyces cerevisiae, Candida kickerharnii, Williopsis californica*, and *Candida boidinii*. In one approach, the amount of exogenous esterase may be from about 0.001% to about 20% w/w of vegetable fat, e.g., from about 0.02% to about 0.2% w/w of vegetable fat, about 0.01% to about 4% w/w of vegetable fat, about 2% to about 20% w/w of vegetable fat, or about 0.001% to about 0.5% w/w of vegetable fat, or about 0.01% to about 0.5% w/w of the vegetable fat. In another approach, the amount of exogenous esterase may be about 3 to about 20 L/550,000 gallons of fermentation composition. In one embodiment, the exogenous esterase is added when fermentation is initiated, after fermentation is initiated, when fermentation is complete, or any combination thereof.

In some embodiments, an exogenous esterase enzyme component at least catalyzes the esterification of one or more free fatty acids in the presence of alcohol (e.g., one or more alcohols such as ethanol) into one or more fatty acid alkyl esters (e.g., one or more fatty acid ethyl esters) and reduce the concentration of the free fatty acids in the resultant grain oil as compared to if the grain oil was not treated with the esterase component (e.g., not treated with exogenous esterase enzyme component). Certain exogenous esterases, in particular, may also lower total phosphorus and metals content in the resultant distiller's corn oil because the FFAs, which are reduced, tended to carry over metals into the isolated oil.

Non-limiting examples of exogenous esterase enzymes includes lipase enzymes, hydrolase enzymes, and combinations thereof. In some embodiments, an exogenous esterase enzyme component can include exogenous triacylglycerol lipase, exogenous carboxylic ester hydrolase, and combinations thereof. Exogenous esterase enzymes are commercially available, for example, from Novozymes under the tradename Eversa®Transform 2.0 enzyme, and under the tradename Lipozyme® CALB L lipase enzyme.

Tables 1 and 2 below illustrates how fermenting in the presence of an exogenous esterase enzyme such as lipase can change the content of free fatty acids as well as the total phosphorus and metals by esterifying the free fatty acids in the presence of ethanol to form fatty acid ethyl esters. It is noted that the first four columns from the left in Table 1 report the dosing of the lipase enzyme in different units. Table 1 reports Lipozyme CALB L lipase enzyme approximate dosing and corresponding FFA and FAEE data in the oil.

TABLE 1

| LU/g DS[a] | % w/w DS | % w/w corn oil | L/550,00 gal Ferm | % FAEE (%w/w)[b] | FFA (%w/w)[b] |
|---|---|---|---|---|---|
| 0 | 0 | 0 | 0 | 13.0 | 17.9 |
| 0.033 | 0.0006 | 0.02 | 5 | 18.6 | 14.1 |
| 0.067 | 0.0013 | 0.04 | 10 | 21.3 | 10.6 |

TABLE 1-continued

| LU/g DS[a] | % w/w DS | % w/w corn oil | L/550,00 gal Ferm | % FAEE (%w/w)[b] | FFA (%w/w)[b] |
|---|---|---|---|---|---|
| 0.323 | 0.0065 | 0.202 | 50 | 29.3 | 4.3 |
| 0.65 | 0.0130 | 0.404 | 100 | 31.2 | 3.9 |

[a]Lipase Unit (LU), Dry Solids (DS)
[b]FFA and FAEE content of oil solvent extracted from the emulsion It has been observed that the content of free fatty acid in oil can be correlated to the content of minerals, metals, metal soaps, and/or other contaminants that are present in a grain oil composition or the resultant distiller's corn oil. For example, when breaking an oil-water emulsion by increasing the pH (e.g., with sodium hydroxide) one or more metal soaps can be formed. During subsequent separation or isolation of the distiller's grain oil, as discussed more below, at least some of these soaps can be carried over into the grain oil product and thereby increase the metal content of the grain oil product even though free metals tend to go with the defatted emulsion. For example, the phosphorus and metal content of soaps can contribute to a relatively high density for soap such that the soap tends to go with the defatted emulsion, which is mostly water on a volume basis, even if the soap is water soluble or water insoluble (e.g., sodium-based and potassium based soaps tend to be water soluble while calcium-based and magnesium-based soaps tend to be water insoluble). But, if the soap content is too high, some soap can "spill over" into the distiller's corn oil product when it is separated from the defatted emulsion.

As the content of free fatty acids in an oil emulsion is reduced, the content of metal soap has been observed to also be relatively lower due to less metal soap being formed. With less soap formation, there is less soap to be carried over and consequently less resulting metal content in the grain oil product. However, it has also been observed that treating an oil composition with too much esterase enzyme component can result in an increase of metal soaps in the oil as compared to if no esterase enzyme treatment had been performed on the oil. While not being bound by theory, it is believed that this may result because as the FAAE content of the oil increases its viscosity decreases leading to a smaller difference between the viscosities of the oil and the defatted emulsion (e.g., defatted emulsion) thereby making a clean separation more difficult and resulting in some of the aqueous phase, including soaps and possibly free metals being carried into the oil phase. In some embodiments, a given separation technique (e.g., centrifuge) may be able to be adjusted to accommodate a shift in viscosities among the oil and defatted emulsion to facilitate making a more clean break when using high doses of lipase. It may also be the result of increasing difficulty in breaking the emulsion with higher lipase doses because the emulsion is relatively more stable. As yet another theory, it is believed that this may result because at higher lipase dose, the lipase favors free fatty acid formation relative to esterification of free fatty acids in the presence of alcohol.

For example and as shown in Table 2 below, the amount of free fatty acid increased when treated with about 50 L/550,000 gal of exogenous lipase as compared to if the oil had not been treated with an exogenous esterase enzyme component for a given set of conditions. However, when treated with about 2 to about 20 L/550,000 gallons (in other approaches, about 2 to about 12 L/550,000 gallons, about 3 to about 12 L/550,000 gallons, or even, about 3 to about 8 L/550,000 gallons), the amount of FFA, minerals, metals, and phosphorus was reduced in the resultant isolated corn oil as shown in Table 2 and as discussed further herein. It is noted that the data in Table 2 represents oil recovered at an ethanol plant after treatment with the lipase enzyme during fermentation in the presence of ethanol and after treatment of a recovered oil-water emulsion with sodium hydroxide, which formed metal soaps. Table 2 reports the effect of exogenous lipase enzyme dosing on FFA, total phosphorus and metals.

TABLE 2

| Lipase Dose (L/550,00 gal) | Lipase | Fermentation pH | Fermentation Hours | % FFA in Oil | Total Phosphorus and Metals, ppm |
|---|---|---|---|---|---|
| 0 | None | 4.5 | 70 | 4.2 | 151 |
| 50 | Novozymes Eversa Transform 2.0 | 4.6 | 70 | 8.9 | 3299 |
| 0 | None | 4.3 | 80 | 7.3 | 276 |
| 5 | Novozymes Lipozyme Calb L | 4.3 | 80 | 4.2 | 57 |
| 0 | None | 4.6 | 90 | 4.8 | 224 |
| 3 | Novozymes Lipozyme CALB L | 4.6 | 90 | 3.8 | 51 |

In some approaches, the type of exogenous lipase and method of isolating the corn oil aid in achieving low levels of metals in the corn oil. In one approach, a lipase based upon sequence and functionality (EC 3.1.1.3) is preferred as well as its appropriate dose to fermentation which is determined by corn quality, fermentation pH, fermentation time, and plant technology. As noted above, a lipase dose of about 2 L to about 20 L per 550,000 gallon fermenter may be used depending on the enzyme formulation activity. In other approaches, the dose may be about 2 to about 12 L per 550,000 gallon fermenter and, in yet other approaches, about 3 to about 12 L per 550,000 gallon fermenter or even about 3 to about 5 L per 550,000 gallon fermenter. If the methods use simultaneous saccharification and fermentation (discussed more below) and raw starch hydrolysis, the lipase dose may be at the lower end of this range at about 2 to about 5 L per 550,000 gallon fermenter. For more conventional ethanol plants performing a high temperature liquefaction prior to fermentation, lipase doses may be at the higher end of this range at about 12 to about 20 L per 550,000 gallon fermenter.

In some approaches, the methods herein can simultaneously convert reduced plant material to sugars and ferment those sugars with a microorganism such as yeast (including the lipase doses mentioned above). Simultaneous saccharifying and fermenting can be conducted using the reagents and conditions described above for saccharifying and fermenting. In an embodiment, saccharification and fermentation is conducted at a temperature of about 25 to about 40° C. or about 30 to about 35° C. In an embodiment, during saccharification and fermentation the temperature is decreased from about 40 to about 25° C. or from about 35 to about 30° C. during the first half of the saccharification, and the temperature is held at the lower temperature for the second half of the saccharification. In an embodiment, simultaneous saccharifying and fermenting can be carried out employing quantities of enzyme and yeast selected to maintain high concentrations of yeast and high levels of budding of the yeast in the fermentation broth. For example, the present process can employ quantities of enzyme and yeast selected to maintain yeast at or above about 300 cells/mL or at about 300 to about 600 cells/mL.

Turning back to FIG. 1, the fermentation product 24 is called beer, which comprises ethanol, water, oil, additional soluble components, unfermented particulate matter, etc. The fermentation product can then be distilled 26 to provide the ethanol 28 and leaving the remaining components as whole stillage 30. The whole stillage 30 can then be separated 31 to provide a liquid component as thin stillage 32 and a solid component as wet cake 34. In some approaches, the thin stillage 32 can be recovered 31 from the solid component 34 of the whole stillage 30 by natural phase separation and decanting, or can be accelerated using methods such as centrifugation. The solid component 34 can be dried to provide the distillers dried grain, whereas the thin stillage 32 can then be further isolated using the methods discussed more below to recover distiller's corn oil with the low levels of minerals, metals, ions and/or other contaminants.

Isolating the lipase treated vegetable oil byproduct from the thin stillage 22 to produce a vegetable oil (such as corn oil) having low levels of minerals, metals, ions, and/or other contaminants may be through one or more of (1) combining at least a portion of the vegetable fat from the fermented composition with water to form a mixture and recovering the isolated vegetable oil from the mixture by separations such as a gravity separation; (2) separating the portion of vegetable fat from the composition into an oil fraction and an aqueous portion by applying a first centrifugal force to the portion of vegetable fat, wherein the oil fraction includes the portion of vegetable fat; adjusting a pH of the oil fraction to form a pH adjusted oil fraction; and separating the pH adjusted oil fraction into an oil composition and a second aqueous portion by applying a second centrifugal force, wherein the oil composition includes the portion of vegetable fat; and/or (3) separating the portion of vegetable fat of the composition into an oil fraction and an aqueous portion through addition of a demulsifying agent. Each subsequent process is discussed further below.

Isolating and Recovering Distiller's Corn Oil by Centrifuge with pH Adjustment

Figure 2:
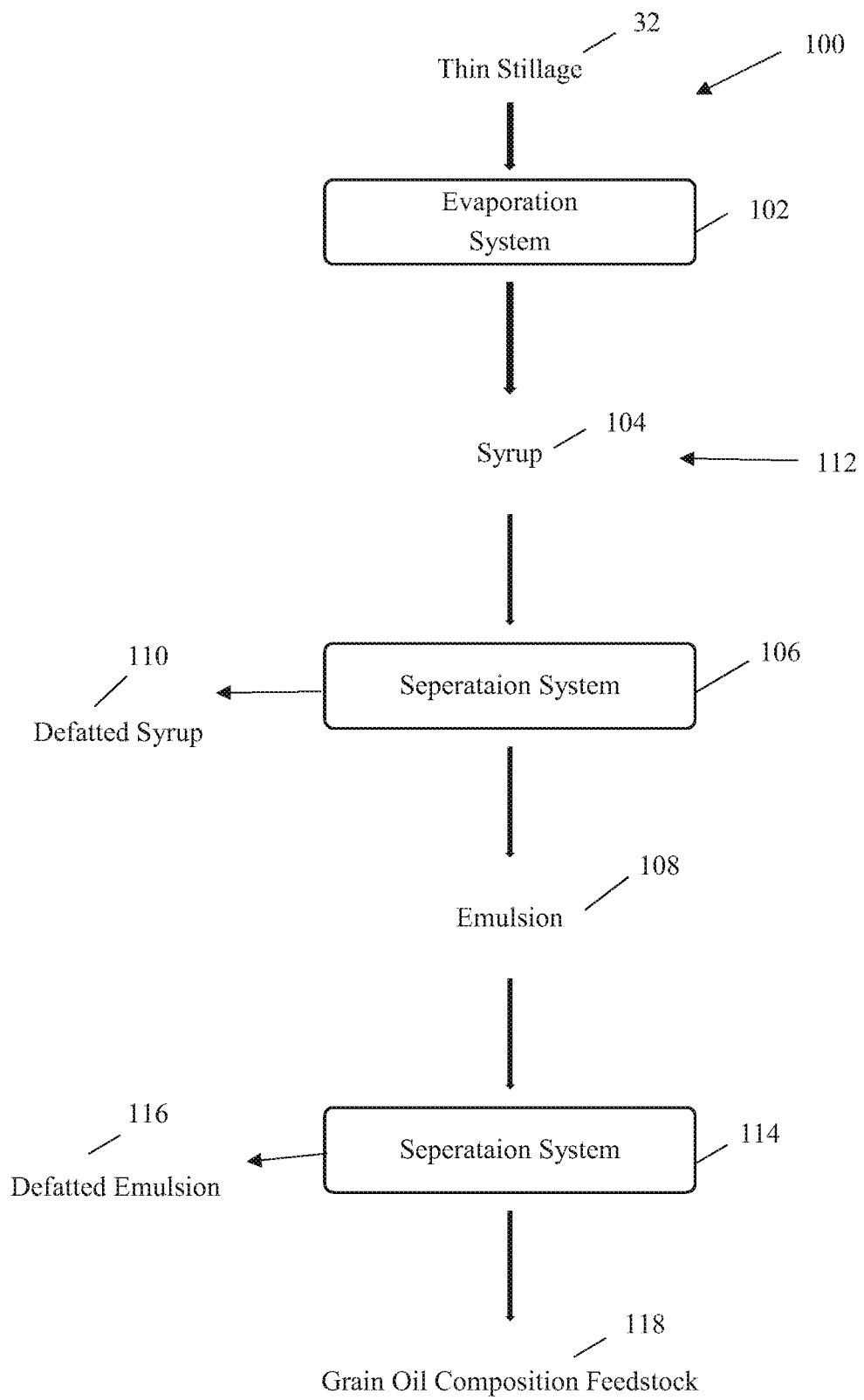
FIG. 2 is a further schematic flow diagram of a process for producing ethanol and recovering byproducts from a vegetable materials such as corn.

In one method 100 and as shown in FIG. 2, the solids concentration of the thin stillage stream 32 can be increased by 102 evaporation where water is evaporated from the thin stillage 32. The concentrated thin stillage, which is referred to as syrup 104, contains an increased concentration of corn oil, which can be separated as an oil composition and sold as distiller's corn oil (DCO) having the reduced levels of contaminants when further processed as discussed herein.

The syrup 104 can be further isolated and separated via separation system 106 into a first oil fraction or emulsion 108 and a first aqueous fraction or defatted syrup 110. The first oil fraction 108 can be referred to as distiller's corn oil or it may be an emulsion. In some embodiments, first oil fraction 108 is a grain oil composition feedstock that is further refined with water as discussed more below. As shown, if first oil fraction 108 is an emulsion, it can have its pH adjusted 112 as discussed herein to break the emulsion into a second oil fraction 118 and a second aqueous fraction or defatted emulsion 116. In some embodiments, as shown, the second oil fraction 118 is a grain oil composition feedstock that may be further refined with water according to the present disclosure.

Separation 106 may be by allowing the phase separation to occur over time and the oil layer decanted or by utilizing centrifuge or a combination thereof, including, but not limited to, for example, a press, extruder, a decanter centrifuge, a disk stack centrifuge, a screen centrifuge or a combination thereof. In some embodiments, the separating 106 does not comprise heating. In one embodiment, separating 106 is by a centrifuge with a continuous flow maintained at about 4000 g, such as about 1000 to about 4000 g, about 2000 to about 4000 g, or about 3000 to about 4000 g.

In one embodiment, once separated from the first aqueous layer, the pH of the emulsion 108 is adjusted such that the emulsion is sufficiently broken, thus providing the oil composition and a second aqueous layer that is separated 114. The pH adjustment 112 allows selective separation of higher quality oil while leaving the free fatty acids in an aqueous fraction by saponifying the fatty acids thus making them more water soluble. Thus, a portion of the free fatty acid is removed resulting in oil that contains low levels of free fatty acid. The age of the fermented product and the organic acid content of the fermented product can affect the optimum pH for separation, however, the oil fraction is treated with the highest pH possible to reduce the overall free fatty acid content in the separated oil without sacrificing oil quality. Typically, suitable pH's range from about 7.0 to about 10. The mixture of the free oil composition and oil fraction can be removed for further processing.

The pH of the emulsion layer 108 may be raised by adding base. For instance, the pH can be adjusted upward by about 1 pH unit, or about 2 pH units, or about 3 pH units, or about 4 pH units, or about 5 pH units, or about 6 pH units. In some embodiments, the pH of the emulsion layer is less than about 4, or about 3.5, prior to the step of adjusting the pH of the emulsion layer. It is contemplated that any inorganic or mineral base can be used for adjusting the pH of the emulsion layer. Suitable bases include, but are not limited to, a base selected from the group consisting of sodium hydroxide, sodium methoxide, potassium hydroxide, calcium hydroxide, or spent alkali wash solution. In some embodiments, the base can be organic base, such as ammonia. Efficient phase separation of the emulsion layer can be achieved by adjusting the pH of the emulsion layer to about 7.0 to about 10, or from about 8 to about 9, or to a pH of about 8.2. Once the emulsion has sufficiently broken, a corn oil layer and a second aqueous layer are provided. The corn oil layer comprises the unrefined corn oil as disclosed herein.

After the pH adjustment, the vegetable oil layer can be separated 114 from the second aqueous layer by allowing the phase separation to occur over time and the oil layer decanted or by utilizing second centrifuge or a combination thereof, including, but not limited to, for example, a press, extruder, a decanter centrifuge, a disk stack centrifuge, a screen centrifuge or a combination thereof. In some embodiments, the separating 114 does not comprise heating. In one embodiment, the separating is by a second centrifuge with a continuous flow maintained at about 4000 g, such as about 1000 to about 4000 g, about 2000 to about 4000 g, or about 3000 to about 4000 g. The grain oil composition feedstock 118 from the second centrifuge may also be further refined and isolated as discussed more below.

Isolating and Recovering Distiller's Corn Oil by Demulsifier:

In another approach of the methods herein, the distiller's corn oil having low levels of contaminants and/or metals may be isolated via a demulsifier. In one embodiment, addition of a demulsifier may be to any of the following process streams: the thin stillage 32, the syrup 104, the emulsion 108, and/or the grain oil composition feedstock 118 can lead to a reduction in minerals, metals, ions, and/or other contaminants in the isolated oil. In some approaches, the demulsifier may allow a broader pH range for emulsion breaking in any subsequent separations. In addition, the demulsifier may have some chelating effects to segregate metals away from the oil fraction. The combination of lipase, demulsifier, and other optional chelating agents or additional processes may be able to produce an oil of less than 20 ppm, or less than 10 ppm of minerals, metals, and/or ions with or without the need for water clarification or other traditional refinement methods as discussed further below. Demulsification may be combined with other isolation or separations methods as needed.

In one approach, the above noted process steams, as appropriate for a particular application, would be treated with a demulsifier at dosing levels of about 50 to about 10,000 ppm, in other approaches, about 1000 to about 5000 ppm, in yet further approaches, about 1500 to about 4000 ppm, and in further embodiments, about 1500 to about 3000 ppm. The pH of the demulsified emulsion could then be adjusted as needed to 5 to 8, and preferably 6 to 7 and then subjected to further separation as needed.

Suitable demulsifiers may be polysorbates, hydrophobic silicas, hydrophilic silicas, lecithin, silica or silicates treated with silicones or silanes, ethyoxylated fatty mono-, di-, or triglycerides or ethoxylated saccharide esters, polyglycerols, polyglycols, polyadducts of polyglycols and alkenyl succinic acid anhydrides, polyesters of polyglycol, alkenyl succinic anhydride polyesters, block copolymers of propylenoxide and ethylenoxide, polyglycerols, polyesters of poly-α-olefin, phenol-formaldehyde resins, epoxy resins, polyethyleneimines, polyamines, di-epoxides, polyols, dendrimers, and the like, or combinations thereof.

In some embodiments, additional metal chelators, such as EDTA, citric acid, phosphoric acid, and the like, could also be added along with the demulsifiers to help aid in the metals being segregated out of the oil. If used, about 0.1 weight percent to about 1.0 weight percent of the additional metal chelators may be added. The broken emulsion could then be centrifuged as discussed previous, further separated as discussed below, and/or further refined with water treatments.

Figure 3:
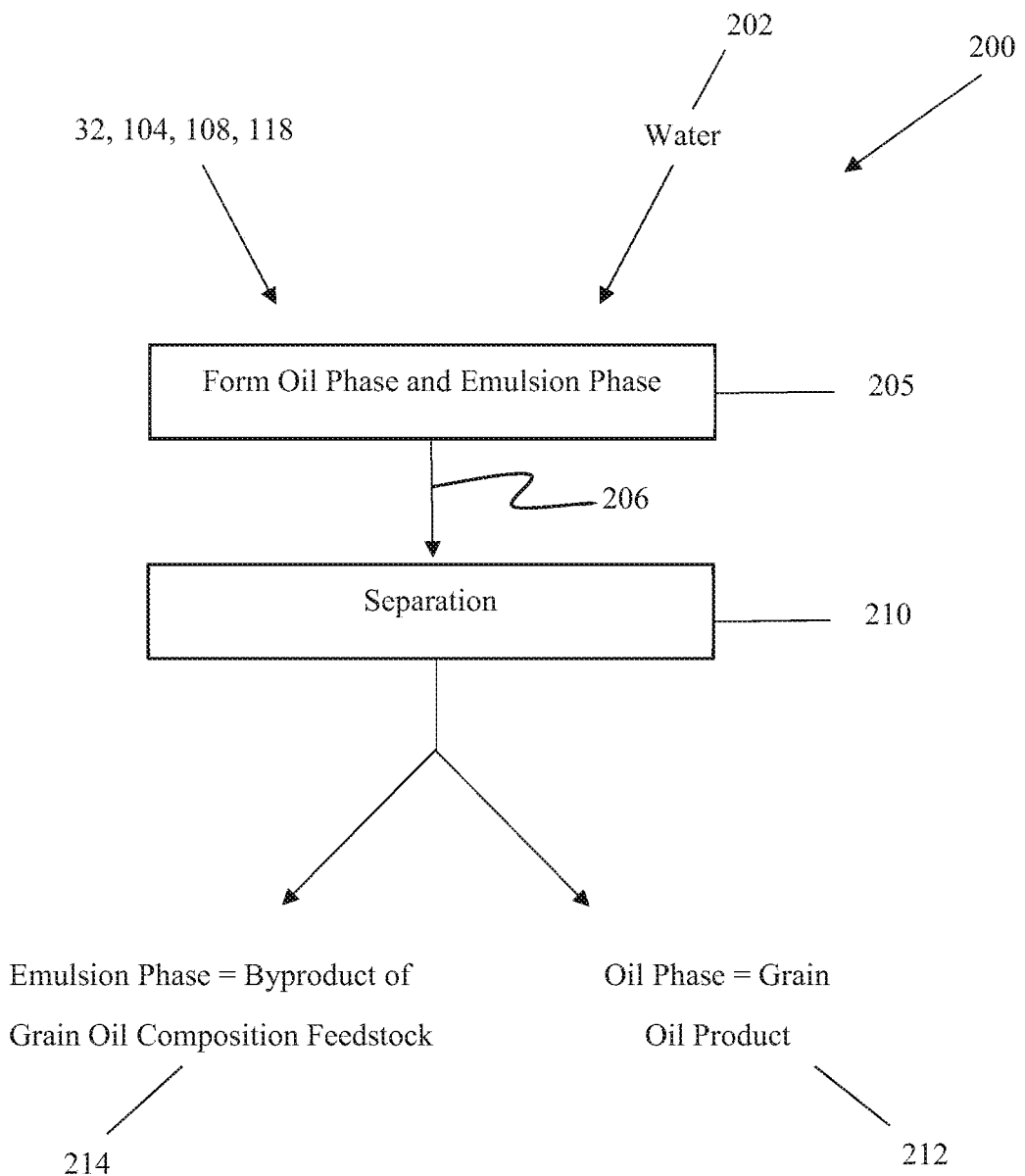
FIG. 3 is a schematic flow diagram of a process for isolating low metals distiller's corn oil from corn.

Refining and Isolating with Water Washing:

In some embodiments, various process steams may be further refined with water washing and then subjected to separations such as gravity separations, centrifuge, or other separations methods to obtain the vegetable oil (such as corn oil) with low levels of contaminants. Turning to FIG. 3, the thin stillage 32, the syrup 104, the emulsion 108, and/or the grain oil composition feedstock 118 streams (optionally after being treated with the demulsifier and/or other additives as discussed above) may be further refined and/or treated by combining with water to form an oil-water mixture. By adding water, the process forms an oil phase or distiller's corn oil having low minerals, metals and/or other contaminants 212 and an emulsion phase byproduct 214 having increased levels of such undesired components. At least a portion of the impurity component, contaminants, metals, and the like can be transferred into the emulsion phase 214, thereby advantageously producing a relatively more pure grain oil product 212 as compared to the grain oil composition feedstock 32, 104, 108, and/or 118.

The amount of water combined with the various process steams noted above is selected so that the amount of water in the oil-water mixture is about 0.1 to about 50 percent based on the total volume of the oil water mixture (v/v), and in other approaches, may be about 2 to about 50 percent, or about 5 to about 50 percent (v/v). In some embodiments, the amount of water in the oil-water mixture is from 10 to 40%, 5 to 10%, 8 to 15%, 10 to 25%, 20 to 35%, 25 to 50%, or even 3 to 50% based on the total volume of the oil water mixture (v/v).

The amount of water added can affect how many layers, or phases, form from the oil-water mixture. In some embodiments, the oil-water mixture forms into at least an oil layer/phase and an emulsion layer/phase. In some embodiments, if a relatively large amount of water is combined with the grain oil composition feedstock, the oil-water mixture can form into three layers/phases. Namely, an oil layer, an emulsion layer and a water layer. In some embodiments, the oil-water mixture forms into a top layer, or light, oil phase and a bottom layer, or heavy, emulsion phase.

A wide variety of systems and apparatuses 200 can be used to combine and mix 205 the selected input stream (that is, the thin stillage 32, the syrup 104, the emulsion 108, and/or the grain oil composition feedstock 118) and a source of water 202 to form an emulsion 206. One or more mixing/agitation apparatuses can be combined in series and/or in parallel. Non-limiting examples include one or more static mixers (e.g., inline static mixers), impeller mixers, pumps, shear mixers, tank recirculation loops, tank mixers (e.g., continuously stirred tank reactors), and combinations thereof (e.g., in series), or other mixers able to disperse the water in the grain oil composition and promote thorough mixing. In some embodiments, a grain oil composition feedstock stream 118 and a water stream 202 can be piped to combine in a common pipe and mix together.

A wide variety of conditions can be used to form an emulsion phase and an oil phase when water washing. For example, the oil-water mixture is exposed to a temperature in the range from about 0° C. to about 50° C. for a time period at least until the oil-water mixture forms at least an oil phase and an emulsion phase. In some embodiments, the oil-water mixture is exposed to a temperature in the range from about 5° C. to about 35° C., about 10° C. to about 30° C., about 15° C. to about 25° C., or even from about 20° C. to about 30° C. In some embodiments, the oil-water mixture is at a temperature in the range from about 0° C. to about 5° C., or about 0° C. to about 10° C. for about 30 minutes to about 5 hours. If needed, the oil-water mixture can be further agitated to facilitate forming an oil phase and an emulsion phase so that at least a portion of the impurity component is sequestered in the emulsion phase.

The oil-water mixture can be mixed for a time period to form the oil phase and emulsion phase and permit at least a portion of the impurity component to be sequestered in the emulsion phase. Mixing parameters are selected according to the mechanical design of the mixer. Mixing may be performed from a period of fractions of a second to hours, e.g., from 5 minutes to 5 hours. Mixing may occur in a continuous flow mixing vessel. If so, adjusting the volume of the continuous flow reactor will adjust the mean residence time of the oil-water mixture in the reactor, thereby controlling the length of the mixing period; e.g. for a given flow through rate, a larger reactor vessel will provide a longer mean residence period. The separation 210 of the grain oil product 212 with low levels of metals and/or other contaminants may be through gravity separation and/or aided gravity separation via a centrifuge as discussed more below.

Figure 4:
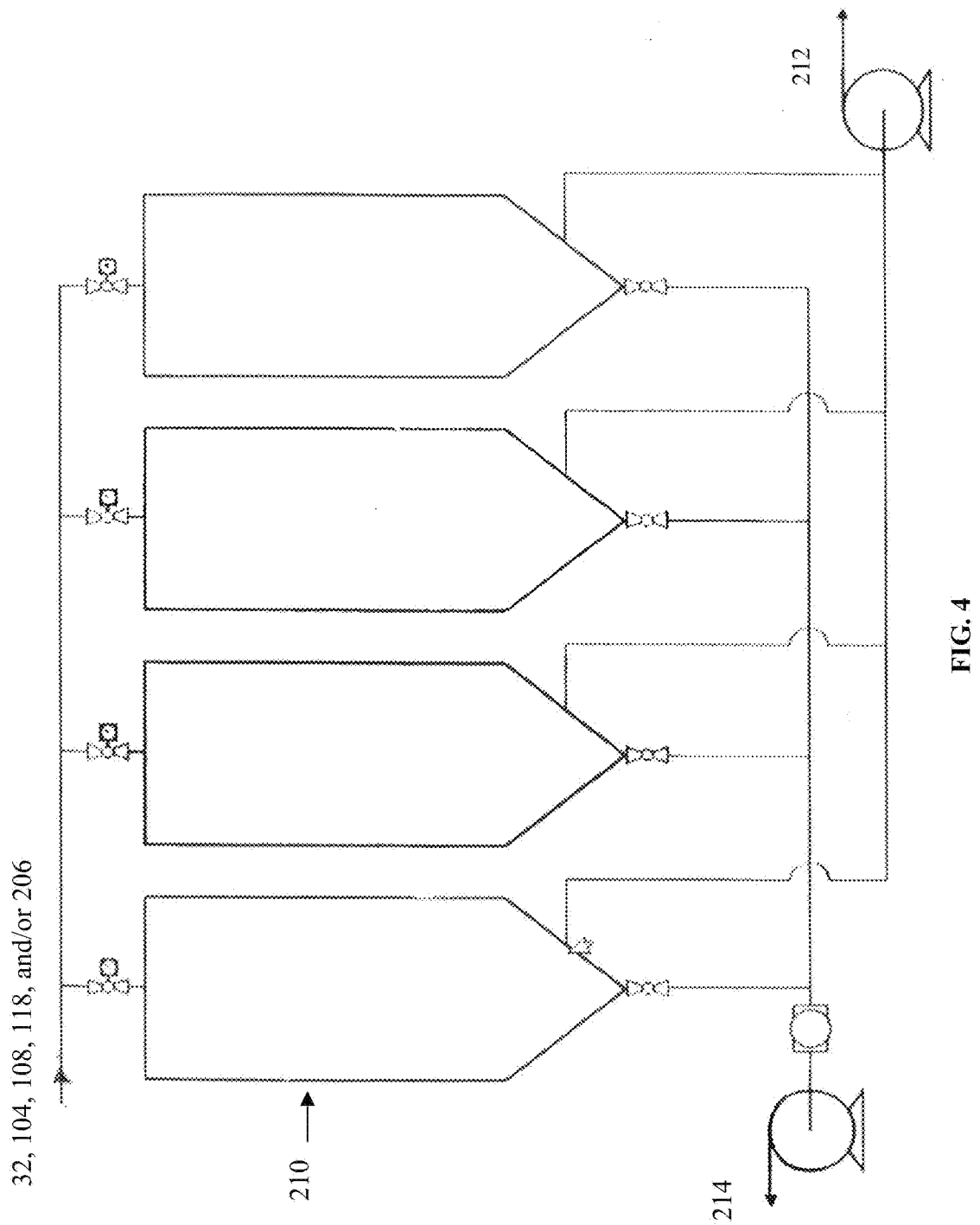
FIG. 4 shows an exemplary flow diagram of a gravity settling apparatus for recovering low metals distiller's corn oil from corn.
Figure 5:
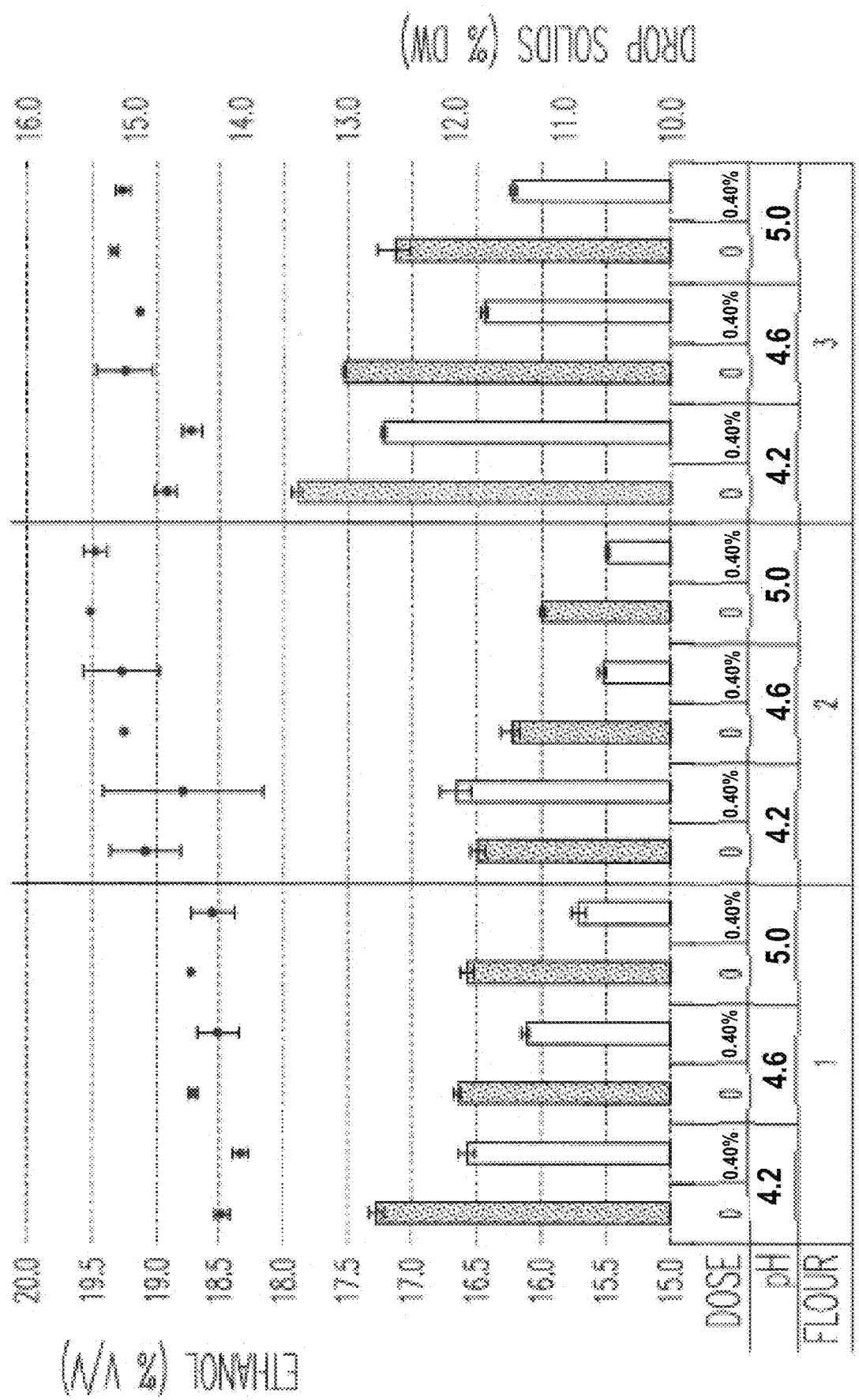
FIG. 5 illustrates the effect of lipase dose on percent solids (drop solids or remaining solids after fermentation) and ethanol content of fermentation at three different pH levels of three different flour batches.

Further Isolating and Recovering the Oil Phase:

In some embodiments, the further separation 210 of the grain oil product 212, such as the vegetable oil or distiller's corn oil, from any of the above noted process streams to obtain a product with low levels of minerals, metals, and/or contaminants is accomplished by allowing gravity phase separation (as generally shown in FIG. 4) to occur over time using a settling tank, a heated and/or cooled settling tank, optionally followed by decanting the oil phase layer. In other embodiments, such separation 210 may be aided by and/or, in the alternative, accomplished more quickly by centrifugation (not shown). These and other methods may be combined.

Gravity separation may be effected through a settling tank or through a series of combined tanks as generally shown in the exemplary process of FIG. 4 to separate the grain oil product 212 with low levels of minerals, metals and/or contaminants from the emulsion 214. The gravity separation may include selective heating for a time and temperature to aid in the settling process. For example, the gravity separation may be for about 10 minutes to about 24 hours and at a tank temperature of about 0° C. to about 100° C. In yet other approaches, the gravity separation is for about 1 to about 16 hours and/or wherein the temperature is about 50 to about 80° C. In some optional approaches, the settling tanks may be heated for a portion of the total settling time, such as wherein the tanks temperature is maintained at about 50 to about 80° C. for the first 4 to about 24 hours and the gravity separation is for about 16 to about 24 hours (with total time for heating and separation up to 24 hours). As shown in FIG. 4, gravity separation may be through a series of tanks. Four are shown, but this arrangement is only exemplary and more or less tanks may be used depending on the application.

In another approach, gravity separation may be aided by centrifugation and/or combined with centrifugation. If used, centrifugation can be by, for example, a decanter centrifuge, a disk stack centrifuge, a cooled disk stack centrifuge, a screen centrifuge, hydrocyclone or a combination thereof. The speed or amount of centrifugal force applied can depend on various factors such as sample size and may be adjusted appropriately depending on such factors. For example, centrifugation may be carried out at 4,200 rpm. In some embodiments, centrifugation is carried out at 4,200 rpm, for 20 minutes and at 27° C. Non-limiting examples of other apparatuses that can be used to separate an emulsion phase from an oil phase include a filter press, a rotary drum filter, cross-flow filtration or some other apparatus that is suitable to separate a liquid stream based on density differences.

According to the present disclosure, an amount of the impurity component in the separated product 214 is greater than an amount of the impurity component in the resulted grain oil product 212. In some embodiments, at least 50 percent by weight of the impurity component in the grain oil feedstock composition 32, 104, 108, 118, and/or 206 is present in the emulsion phase 214, at least 60 percent by weight of the impurity component in the grain oil feedstock composition is present in the emulsion phase, at least 70 percent by weight of the impurity component in the grain oil feedstock composition is present in the emulsion phase, at least 80 percent by weight of the impurity component in the grain oil feedstock composition is present in the emulsion phase, at least 90 percent by weight of the impurity component in the grain oil feedstock composition is present in the emulsion phase, or even at least 95 percent by weight of the impurity component in the grain oil feedstock composition is present in the emulsion phase.

Maintaining low levels of moisture is advantageous as moisture can result in the formation of free fatty acids and high levels of minerals, metals, chlorides, and/or contaminants. The corn oil compositions herein, such as product 212, may have a moisture content of less than about 1 weight percent. The moisture in the corn oil compositions can comprise water along with other soluble components, such as one or more alkali and/or alkaline metal, and may further contain other soluble components, such as volatile material including hexane, ethanol, methanol, and the like. The pH of the water that makes up the moisture content is, in general, alkaline (i.e., >7) and comprises the one or more alkali and/or alkaline metals. In some embodiments, the moisture content of the corn oil compositions 212 is from about 0.2 to about 1 weight percent, or alternatively, about or less than about 0.8 weight percent, or alternatively, about or less than about 0.6 weight percent, or alternatively, about or less than about 0.4 weight percent, or alternatively, about 0.2 weight percent.

In certain embodiments using the lipase treatments discussed above combined with the various separation methods herein, the final or isolated corn oil compositions 212 have a low level of minerals and/or metal ions. In some approaches, the isolated corn oil compositions having a mineral and/or metal ion concentration of about 0.4 ppm to about 20 ppm or, in other approaches, about 0.4 ppm about 10 ppm. In some embodiments, the corn oil compositions 212 have a mineral or metal ion concentration ranging from about 0.4 ppm, about 0.5 ppm, about 0.6 ppm, about 0.7 ppm, about 0.8 ppm and up to about 20 ppm, up to about 15 ppm, or preferably, up to about 10 ppm. The mineral or metal ion present in the composition can be any mineral, alkali metal ion, and/or any alkaline metal ion, and is in some embodiments, is any combination of lithium, sodium, magnesium, potassium, phosphorus, and/or calcium. In other approaches, the corn oil compositions 212 may also have a reduced chloride content, such as about 20 ppm or less, about 15 ppm or less, about 10 ppm or less, or even about 5 ppm or less, and in some instances, about 0.1 ppm or more, about 1 ppm or more in such context.

In one embodiment, the resultant corn oil compositions 212 may also include a free fatty acid content of less than about 5 weight percent; a moisture content of from about 0.2 to about 1 weight percent; and an ammonia and/or ammonium ion content of greater than about 10 ppm, or from about 0.4 ppm to about 20 ppm (or any other range as discussed above). Metals can be determined by test method AOCS Ca 17-01. Phosphorus can be determined by test method AOCS Ca 20-99. Sulfur can be determined by test method ASTM D4951. In some embodiments, at least a portion (e.g., including substantially all) of the metal component is present as soap, which is a salt of the metal and a fatty acid such as sodium oleate, magnesium stearate, combinations of these, and the like. Soap content can be determined by test method AOCS Cc17-95. In some embodiments, the grain oil product contains no detectable phospholipid. For example, any phospholipid that may have been inherently present in the raw grain material may have been removed in an upstream process.

The isolated oil composition 212 can be used in a wide variety of applications. Such exemplary applications include the areas of oleochemicals, feed (e.g., animal feed) as well as oils suitable for human consumption, asphalt rejuvenation, performance grade (PG) asphalt enhancement and/or bio-diesel, renewable diesel via hydrotreating in presence of catalyst. Accordingly, one embodiment is a recycled asphalt composition or performance-grade composition comprising the unrefined corn oil composition as described herein which may decrease the viscosity of the resulting mixture and/or enhance the properties of the pavement made therefrom, e.g., enhanced resistance to cracking including but not limited to transverse cracking and age-induced surface cracking. Oleochemicals include feedstock chemicals that are suitable for bio-diesel production (fatty acid methyl esters). Industrial oleochemicals are useful in the production of soaps, detergents, wire insulation, industrial lubricants, leather treatments, cutting oils, mining agents for oil well drilling, ink removal, plastic stabilizers, ink and in rubber production. Other industrial applications include waxes, shampoos, personal hygiene and food emulsifier or additive products. The low levels of minerals, metals, ions, and other contaminants make the products isolated via the methods herein especially suitable for feedstock for subsequent biofuel production

EXAMPLES

The following examples are illustrative of exemplary embodiments of the disclosure. In these examples, as well as elsewhere in this application, all ratios, parts, and percentages are by weight unless otherwise indicated. It is intended that these examples are being presented for the purpose of illustration only and are not intended to limit the scope of the invention disclosed herein.

Example 1

A simultaneous saccharification and fermentation (SSF) process is employed, where starch-based feedstocks such as corn (maize), sorghum (milo), and/or wheat, are used for the production of ethanol. In this process, raw starch hydrolyzing enzymes are used to breakdown the starch into monomeric glucose which is then metabolized by the microorganism (yeast, *Saccharomyces cerevisiae*) to produce ethanol. This process may also be termed as raw starch hydrolysis or cold cook process.

Corn is first processed with a Hammer mill using 0.5 mm to 2.0 mm screens to grind the flour to the required particle size. The percent solids and percent moisture of the corn flour and preblend used in fermentation is determined by mass loss on drying in a 100° C. oven. Preblend is defined as a nutrient source derived from recycled plant makeup water composed of diluted and partially clarified thin stillage. The fat content of the flour is determined by accelerated fat extraction utilizing an extraction system (Dionex ASE 350) with hexane as the extracting solvent.

First, 1-3 colonies of yeast isolated off yeast extract and soy peptone containing 3% glucose (YP medium) agar plate, or alternatively slurried dry yeast or cèrme yeast, were used to inoculate 50 mL of YP culture media in a shake flask. This was then allowed to shake in a water bath at 150 rpm overnight for approximately 17 hours at 30° C. The conditioning medium was then prepared in a 1 L Pyrex bottle capped with a lid with a hole to release carbon dioxide produced during fermentation. To the fermenter bottle, corn flour was added and slurried up to a final solids loading of 32% using preblend. The slurry was pH adjusted to 4.5 using 10% (% v/v) sulfuric acid. In addition, an appropriate amount of antibiotic, urea, a cocktail of α-amylases and glucoamylases are added to the slurry according to U.S. Pat. No. 7,842,484. Yeast culture at approximately 1.0E+07 cells mL-1 was added to the fermenter to give a final number of 7.0E+08 yeast cells in the fermenter. The conditioning fermentation was allowed to ferment in a water batch shaking at 150 rpm at 30-32.2° C. for eight hours.

Fermentation was carried out as in the conditioning step according to U.S. Pat. No. 7,842,484 unless stated otherwise. For fermentation, a 500 mL Pyrex bottles were used for a total fermentation volume of 250 mL. The corn was slurried with preblend to a total percent solids of 36.5%. In addition, an esterase such as a lipase (Novozymes Eversa Transform 2.0), was added to the slurry as well. The dose of the enzyme is based upon the total weight of corn fat present in the fermenters. A typical dose is 0.4% (% w/w), although experiments with 0.04% and 4.0% were performed as well. Fermentation in the bottles was allowed to progress for 88 hours, at which point the beer was sampled and harvested for oil analysis.

The oil was extracted from the entire volume of beer remaining after sampling. First, the beer was centrifuged at approximately 4° C. for 20 minutes at 4500 rpm in a bench centrifuge. The resulting floating oil emulsion was then removed. The emulsion was put in 50 ml conical tubes to which approximately 10-20 mL of chloroform was added and vortexed. Then 10-20 mL of deionized water was also added to help with separation. The 50 mL tubes were then centrifuged at 3000 rpm for five minutes. The bottom layer (chloroform+oil) was pulled off and put into tared glass vials and inserted into a turbovap to evaporate off the solvent. The resulting dry oil was then used to quantify fatty acid ethyl esters.

TABLE 3

| | Total metals (ppm) | | | |
|---|---|---|---|---|
| | Non-lipase | Lipase (7.5L)* | Lipase (4)* | Lipase (3.5L)* |
| NO treatment | 147.23 | 50.29 | 22.49 | 16.18 |
| Settling overnight | 67.31 | 25.27 | 6.4 | 11.39 |
| heat (4 hr, 80° C.), settling overnight | 73.46 | 14.78 | 6.67 | 12.79 |
| Heat overnight (80° C.) | 86.16 | 22.83 | 10.76 | 11.59 |
| {5% water, 95% oil} Settling overnight | 45.12 | 20.07 | 4.82 | 7.55 |
| {5% water, 95% oil} heat (4 hr, 80° C.) | 72.32 | 14.69 | 4.77 | 6.09 |
| {5% water, 95% oil} Heat overnight (80° C.) | 83.2 | 19.14 | 10.04 | 8.29 |
| {10% water, 90% oil} Settling overnight | 37.77 | 18.25 | 4.39 | 5.89 |
| {10% water, 90% oil} heat (4 hr, 80° C.), | 61.45 | 13.13 | 4.94 | 5.52 |
| {10% water, 90% oil} Heat overnight (80° C.) | 69.89 | 16.67 | 4.38 | 5.53 |

*Lipase dosage in liters per 550,000 gallons

TABLE 4

| | Metals (ppm) | | | | Chlorides (ppm) | | | | Moisture (mass %) | | | |
|---|---|---|---|---|---|---|---|---|---|---|---|---|
| | Lipase (3.5 L)* | Lipase (4 L)* | Lipase (7.5 L)* | non lipase | Lipase (3.5 L)* | Lipase (4 L)* | Lipase (7.5 L)* | non lipase | Lipase (3.5 L)* | Lipase (4 L)* | Lipase (7.5 L)* | non lipase |
| NO treatment | 28.0 | 30.6 | 47.1 | 130.4 | 268.2 | 40.29 | 6.55 | 5.11 | 0.2 | 0.4 | 0.5 | 0.5 |
| 4 hr settling (50 mL oil) | 14.4 | 18.8 | 38.94 | 89.3 | 16.0 | 6.31 | 4 | 3.61 | 0.2 | 0.3 | 0.3 | 0.4 |
| 16 hr settling (50 mL oil) | 12.8 | 9.1 | 20.0 | 65.3 | 3.3 | 3.92 | 3.13 | 3.42 | 0.2 | 0.3 | 0.2 | 0.3 |
| 4 hr settling (5 mL water, 45 mL oil) | 8.0 | 9.2 | 21.4 | 34.9 | 4.1 | 5.99 | 3.32 | 3.29 | 0.2 | 0.3 | 0.2 | 0.2 |
| 16 hr settling (5 mL water, 45 mL oil) | 4.2 | 4.9 | 14.6 | 16.1 | 4.7 | 3.13 | 3.31 | 3.36 | 0.2 | 0.3 | 0.2 | 0.2 |

*Lipase dosage is liters per 550,000 gallons

Example 2

Comparisons were performed on mineral and metals reductions in distiller's corn oil from ethanol production with and without exogenous esterase (Lipozyme CALB L lipase enzyme) added to the ethanol fermentation. Esterase dosage for this study ranged from about 3 to about 8 liters per 550,000 gallons as shown in table below. The distiller's corn oil was isolated using gravity separation with the water washing, temperatures, and retention times as set forth in Tables 3 and 4 below. The results show that exogenous esterase combined with the gravity separation resulted in distiller's corn oil with lower levels of metal and mineral contaminants as measured using AOCS Ca 17.01.

Example 3

Comparisons were made between distiller's corn oil samples isolated from an ethanol process using lipase dosed fermentations or no lipase. In each case for this comparison, lipase dosage was about 6 L/550,000 gallons (Lipozyme CALB L lipase enzyme). The resulting emulsions were heated and in 50 mL conical tubes to about 80° C. and pH adjusted using 25% (% w/w) caustic to the given pH set point. The pH adjusted emulsions were allowed to sit at temperature for 20 minutes. Emulsions were centrifuged at 4500 rpms for 3 minutes and total metals (including phosphorus) were measured using AOCS Ca 17.01. Results are shown below in Table 5 and show that lipase addition to fermentation decreases metals in the recovered corn oil when combined with gravity settling and centrifuge separations.

TABLE 5

|  | A No-Lipase | B No-Lipase | C No-Lipase | D Lipase | E Lipase | F Lipase |
|---|---|---|---|---|---|---|
| pH | 7.0 | 7.2 | 7.5 | 7.0 | 7.2 | 7.5 |
| Oil Recovery (% v/v) | 92% | 90% | 100% | 80% | 80% | 80% |
| Total Metals (ppm) | 12.5 | 18.1 | 38.5 | 5.7 | 5.1 | 7.9 |

Example 4

Corn oil emulsions resulting from either lipase dosed fermentations or no lipase were sampled from an ethanol refinery. Lipase dosage was again about 6 L/550,000 gallons. The emulsions were heated in 50 mL conical tubes to about 80° C. About 3333 ppm of a demulsifier (AMS COD-711H, Applied Material solutions) was added to each tube. The pH was then adjusted using 25% (% w/w) caustic to the given pH set point. The pH adjusted emulsions were allowed to sit at temperature for 20 minutes. Next, the pH adjusted emulsions were centrifuged at 4500 rpms for 3 minutes and tested for metals as noted in Example 3. Results are provided in Table 6 below. Again, lipase treatment during ethanol fermentation combined with the demulsifier, gravity settling, and centrifuge separations resulted in distiller's corn oil with lower levels of total metals.

TABLE 6

|  | G No-Lipase | H No-Lipase | I No-Lipase | J No-Lipase | K No-Lipase | L Lipase | M Lipase | N Lipase | O Lipase |
|---|---|---|---|---|---|---|---|---|---|
| pH | 5.5 | 6.0 | 6.5 | 7.0 | 7.5 | 5.5 | 6.0 | 6.5 | 7.0 |
| Oil Recovery (% v/v) | 95% | 97% | 97% | 98% | 100% | 86% | 90% | 96% | 100% |
| Total Metals (ppm) | 4.7 | 5.3 | 6.0 | 10.1 | 30.3 | 3.5 | 4.1 | 4.0 | 6.5 |

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A process for reducing the content of ions in a vegetable oil obtained from fermentation of ground vegetable material, the process comprising:
    fermenting a sugar obtained from a ground vegetable material to produce ethanol in a composition that further includes one or more of water, residual ground vegetable material, and vegetable fat;
    adding about 0.001 to about 0.5% w/w of an exogenous esterase based on the total weight of the vegetable fat before, during, or after the fermenting; and
    isolating vegetable oil from a portion of the composition in a manner effective to produce an isolated vegetable oil having ions but no more than about 20 ppm of ions.

2. The process for reducing the content of metal ions in a vegetable oil obtained from fermentation of ground vegetable material of claim 1, wherein the isolating includes combining at least a portion of the vegetable fat from the composition with water to form a mixture and recovering the isolated vegetable oil from the mixture by gravity separation.

3. The process for reducing the content of metal ions in a vegetable oil obtained from fermentation of ground vegetable material of claim 2, wherein the gravity separation is through one or more settling tanks.

4. The process for reducing the content of metal ions in a vegetable oil obtained from fermentation of ground vegetable material of claim 2, wherein about 0.1 to about 30% w/w water is combined with the portion of vegetable fat.

5. The process for reducing the content of metal ions in a vegetable oil obtained from fermentation of ground vegetable material of claim 2, wherein about 2 to about 20% w/w water is combined with the portion of vegetable fat.

6. The process for reducing the content of metal ions in a vegetable oil obtained from fermentation of ground vegetable material of claim 2, wherein the isolating further includes separating the portion of vegetable fat from the composition into an oil fraction and an aqueous portion by applying a first centrifugal force to the portion of vegetable fat, wherein the oil fraction includes the portion of vegetable fat; adjusting a pH of the oil fraction to form a pH adjusted oil fraction; and separating the pH adjusted oil fraction into an oil composition and a second aqueous portion by applying a second centrifugal force, wherein the oil composition includes the portion of vegetable fat.

7. The process for reducing the content of metal ions in a vegetable oil obtained from fermentation of ground vegetable material of claim 5, wherein the pH is adjusted to a range of about 3 to about 7.

8. The process for reducing the content of metal ions in a vegetable oil obtained from fermentation of ground vegetable material of claim 5, wherein the pH is adjusted to a range of about 3.5 to about 6.

9. The process for reducing the content of metal ions in a vegetable oil obtained from fermentation of ground vegetable material of claim 5, wherein the pH is adjusted to a range of about 7 to about 10.

10. The process for reducing the content of metal ions in a vegetable oil obtained from fermentation of ground vegetable material of claim 1, wherein the isolating further includes separating the portion of vegetable fat of the composition into an oil fraction and an aqueous portion through addition of a demulsifying agent, wherein the oil fraction includes the portion of vegetable fat.

11. The process for reducing the content of metal ions in a vegetable oil obtained from fermentation of ground vegetable material of claim 10, wherein the demulsifying agent is selected from silica, silicates, lecithin, wax, polyethylene, resins, ethyoxylated fatty mono-, di-, or triglycerides or ethoxylated saccharide esters, polyglycerols, polyglycol, polyadduct of polyglycol and alkenyl succinic acid anhydride, polyester of polyglycol, alkenyl succinic anhydride polyester, block copolymer of propylenoxide and ethylenoxide, polyglycerol, polyester of poly-a-olefin phenol-formaldehyde resins, epoxy resins, polyethyleneimines, polyamines, di-epoxides, polyols, dendrimers thereof, or combinations thereof.

12. The process for reducing the content of metal ions in a vegetable oil obtained from fermentation of ground vegetable material of claim 2, wherein the gravity separation is for about 10 minutes to about 24 hours and at a mixture temperature of about 0° C. to about 100° C.

13. The process for reducing the content of metal ions in a vegetable oil obtained from fermentation of ground vegetable material of claim 12, wherein the gravity separation is for about 1 to about 16 hours.

14. The process for reducing the content of metal ions in a vegetable oil obtained from fermentation of ground vegetable material of claim 13, wherein the mixture temperature is about 50 to about 80° C.

15. The process for reducing the content of metal ions in a vegetable oil obtained from fermentation of ground vegetable material of claim 2, wherein the gravity separation is for about 1 to about 24 hours and the mixture is maintained at a temperature of about 50 to about 80° C. for about 4 to about 24 hours of the gravity separation.

16. The process for reducing the content of metal ions in a vegetable oil obtained from fermentation of ground vegetable material of claim 1, wherein the isolating includes recovering the isolated vegetable oil from the mixture by gravity separation.

17. The process for reducing the content of metal ions in a vegetable oil obtained from fermentation of ground vegetable material of claim 16, wherein the gravity separation is for about 1 to about 24 hours and the mixture is maintained at a temperature of about 50 to about 80° C. for about 4 to about 24 hours of the gravity separation.

18. The process for reducing the content of metal ions in a vegetable oil obtained from fermentation of ground vegetable material of claim 1, wherein the fermenting is at a pH of about 3 to about 6.

19. The process for reducing the content of metal ions in a vegetable oil obtained from fermentation of ground vegetable material of claim 18, wherein the fermenting is at a temperature of about 25° C. to about 40° C.

20. The process for reducing the content of metal ions in a vegetable oil obtained from fermentation of ground vegetable material of claim 18, wherein the exogenous esterase is added during the fermenting.

21. The process for reducing the content of metal ions in a vegetable oil obtained from fermentation of ground vegetable material of claim 1, wherein the isolated vegetable oil has about 50 to about 95% less ions than an isolated vegetable made by the same process but without the exogenous esterase.

22. The process for reducing the content of metal ions in a vegetable oil obtained from fermentation of ground vegetable material of claim 1, wherein the ions are selected from one or more of from lithium, sodium, magnesium, potassium, calcium, phosphorus, or combinations thereof.

23. The process for reducing the content of metal ions in a vegetable oil obtained from fermentation of ground vegetable material of claim 1, wherein the isolated vegetable oil has no more than about 10 ppm of ions.

24. The process for reducing the content of metal ions in a vegetable oil obtained from fermentation of ground vegetable material of claim 1, wherein the isolated vegetable oil has no more than about 20 ppm of chlorides.

* * * * *